US012577790B2

(12) United States Patent
Boucké

(10) Patent No.: US 12,577,790 B2
(45) Date of Patent: Mar. 17, 2026

(54) DECORATIVE PANEL, AND DECORATIVE FLOOR COVERING CONSISTING OF SAID PANELS

(71) Applicant: I4F Licensing NV, Turnhout (BE)

(72) Inventor: Eddy Alberic Boucké, Turnhout (BE)

(73) Assignee: i4F Licensing NV, Turnhout (BE)

( * ) Notice: Subject to any disclaimer, the term of this patent is extended or adjusted under 35 U.S.C. 154(b) by 229 days.

(21) Appl. No.: 18/270,765

(22) PCT Filed: Jan. 4, 2022

(86) PCT No.: PCT/EP2022/050093
§ 371 (c)(1),
(2) Date: Jul. 3, 2023

(87) PCT Pub. No.: WO2022/148754
PCT Pub. Date: Jul. 14, 2022

(65) Prior Publication Data
US 2024/0052643 A1 Feb. 15, 2024

(30) Foreign Application Priority Data

Jan. 5, 2021 (NL) ...................................... 2027270
Jan. 14, 2021 (NL) ...................................... 2027318

(51) Int. Cl.
*E04F 15/00* (2006.01)
*B32B 5/12* (2006.01)
(Continued)

(52) U.S. Cl.
CPC .......... *E04F 15/02038* (2013.01); *B32B 5/12* (2013.01); *B32B 5/145* (2013.01);
(Continued)

(58) Field of Classification Search
CPC .......... E04F 15/02033; E04F 15/02038; E04F 15/107; E04F 15/102; E04F 2201/042;
(Continued)

(56) References Cited

U.S. PATENT DOCUMENTS 8,034,415 B2 10/2011 Huenig et al.
8,769,895 B2 * 7/2014 Amend ................. B32B 27/065
52/309.4
(Continued)

FOREIGN PATENT DOCUMENTS

EP 2202056 A1 6/2010
EP 2277691 A1 1/2011
(Continued)

OTHER PUBLICATIONS

Kowatsch, "Chapter 10-Mineral Wool Insulation Binders," Phenolic Resins: A Century of Progress, L. Pilato edition, 2010, pp. 209-242, Springer.

*Primary Examiner* — Chi Q Nguyen
(74) *Attorney, Agent, or Firm* — The Webb Law Firm

(57) ABSTRACT

A decorative panel including a core provided with an upper side and a lower side, a decorative top structure affixed, either directly or indirectly, on the upper side of the core, a first panel edge comprising a first coupling profile, and a second panel edge comprising a second coupling profile designed to interlockingly engage with the first coupling profile of an adjacent panel, both in a horizontal direction and in a vertical direction. The core comprises at least one wool layer at least partially formed by man-made vitreous fibres bonded together by at least one cured thermoset polymeric binder material. The decorative top structure comprises at least one ceramic layer and/or glaze layer, wherein the decorative top structure is adhered onto the core with a waterproof adhesive.

20 Claims, 5 Drawing Sheets

(51) Int. Cl.

| | |
|---|---|
| *B32B 5/14* | (2006.01) |
| *B32B 7/12* | (2006.01) |
| *B32B 9/00* | (2006.01) |
| *B32B 9/04* | (2006.01) |
| *B32B 19/02* | (2006.01) |
| *E04F 15/02* | (2006.01) |

(52) U.S. Cl.
CPC .............. *B32B 7/12* (2013.01); *B32B 9/005* (2013.01); *B32B 9/047* (2013.01); *B32B 19/02* (2013.01); *B32B 2250/02* (2013.01); *B32B 2260/021* (2013.01); *B32B 2260/046* (2013.01); *B32B 2262/10* (2013.01); *B32B 2307/72* (2013.01); *B32B 2307/7376* (2023.05); *B32B 2419/04* (2013.01); *B32B 2451/00* (2013.01); *B32B 2471/00* (2013.01); *B32B 2607/00* (2013.01)

(58) Field of Classification Search
CPC .......... E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; E04F 13/0826; E04F 13/0894; B32B 5/12; B32B 5/145; B32B 7/12; B32B 9/005; B32B 9/047; B32B 19/02; B32B 2307/7376; B32B 2250/02; B32B 2260/021; B32B 2260/046; B32B 2262/10; B32B 2307/72; B32B 2419/04; B32B 2451/00; B32B 2471/00; B32B 2607/00

See application file for complete search history.

(56) References Cited

U.S. PATENT DOCUMENTS

| | | | |
|---|---|---|---|
| 10,626,306 B2 | 4/2020 | Goletto | |
| 10,677,275 B1 | 6/2020 | Caselli et al. | |
| 11,124,973 B2 | 9/2021 | Clement | |
| 11,174,578 B2 | 11/2021 | Hjelmgaard et al. | |
| 11,560,721 B2 | 1/2023 | Dohring | |
| 2013/0055665 A1* | 3/2013 | Qiong ............... | E04F 15/02172 52/177 |
| 2015/0233127 A1* | 8/2015 | Dohring ........... | E04F 15/02172 52/177 |
| 2018/0127987 A1* | 5/2018 | Bradway ............. | D06N 7/0076 |
| 2018/0134016 A1* | 5/2018 | Burns ..................... | B32B 5/022 |
| 2021/0285230 A1* | 9/2021 | Baert ........................ | E04B 1/86 |
| 2022/0056703 A1 | 2/2022 | Boucke | |
| 2024/0026688 A1* | 1/2024 | Boucké ................. | G06Q 10/30 |
| 2024/0309654 A1* | 9/2024 | Baert .................... | E04F 15/107 |
| 2025/0001738 A1* | 1/2025 | Baert ........................ | B32B 5/18 |
| 2025/0115024 A1* | 4/2025 | Baert ................. | B29C 44/3415 |

FOREIGN PATENT DOCUMENTS

| | | | |
|---|---|---|---|
| EP | 3144449 | A1 | 3/2017 |
| WO | 2007060237 | A1 | 5/2007 |
| WO | 2017108124 | A1 | 6/2017 |
| WO | 2017194717 | A1 | 11/2017 |
| WO | 2019064201 | A1 | 4/2019 |
| WO | 2020114642 | A1 | 6/2020 |

* cited by examiner

DECORATIVE PANEL, AND DECORATIVE FLOOR COVERING CONSISTING OF SAID PANELS

CROSS-REFERENCE TO RELATED APPLICATIONS

This application is the United States national phase of International Application No. PCT/EP2022/050093 filed Jan. 4, 2022, and claims priority to The Netherlands Patent Application Nos. 2027270 filed Jan. 5, 2021 and U.S. Pat. No. 2,027,318 filed Jan. 14, 2021, the disclosures of which are hereby incorporated by reference in their entireties.

BACKGROUND OF THE INVENTION

Field of the Invention

The invention relates to a panel, in particular a decorative panel, a floor panel, a ceiling panel or a wall panel. The invention also relates to a covering consisting of a plurality of mutually coupled panels according to the invention, in particular a floor covering consisting of a plurality of mutually coupled panels, according to the invention.

Description of Related Art

In the field of decorative floor coverings, decorative panels are known having a MDF (Medium Density Board) or HDF (High Density Board) based core layer on top of which a decorative substrate is attached to provide the panels a desired appearance. A major disadvantage of these known panels is the hygroscopic nature of the core layer, which affects the lifetime and durability of such panels. For this reason, the traditional MDF/HDF based panels are more and more replaced by polyvinyl chloride (PVC) based panels, also provided with a decorative substrate on top. These PVC based panels have the advantage over of being relatively waterproof compared to MDF/HDF based panels. The PVC based panels are typically enriched with chalk (calcium carbonate), acting as inert filler, wherein the applied amount of chalk has been increased in the course of time, in particular to reduce the cost price of the panels. These panels are also referred to as stone-plastic composite (SPC) panels. A first drawback, however, of these PVC based panels is that the temperature resistance is very poor, as a result of which these panels will typically easily deform (curve) in case these panels are exposed to a heating source, like a heating radiator or even a lamp. Moreover, a common additional important drawback of both the MDF/HDF based panels and the PVC based panels is the flammability of these panels. Flammability of furniture is of concern as, for example, cigarettes and candle accidents can easily trigger domestic fires. Additionally, the trend to use more chalk in the PVC based panels seriously increases the brittleness of the panels, which consequently increases the risk of breakage of the panels. In particular, in case the panels are profiled to allow adjacent panels to interlock with each other, the risk of breakage of the coupling profiles of the panels prior to use and during use has been increased seriously, which often renders these panels less or even not suitable anymore to compose a so-called floating floor covering consisting of interlocked panels. Hence, there is a general need in the field of decorative flooring to further develop decorative panels to counteract at least one of the above drawbacks, and in particular to develop a decorative panel which is relatively fireproof. There is an additional need to develop a decorative panel having an improved dimensional stability when subjected to temperature fluctuations during regular use. There is a further need to develop an interlockable panel which can be profiled relatively smoothly, preferably in dependent of the hardness of a decorative top layer of the panel, and wherein the coupling profiles exhibit a reduced risk of breakage.

EP 3 144 449 discloses a plate-shaped building element, in particular floor panel, which has a carrier plate with a decorative layer on the upper side, wherein the decorative layer comprises a flat decorative substrate, wherein the carrier plate consists of compressed rock wool, and wherein locking means are provided on the side edges of the carrier plate.

SUMMARY OF THE INVENTION

It is an objective of the invention to meet at least one of the needs addressed above.

The above objective of the invention, is met by the provision of a decorative panel as described herein.

Typically, the wool layer comprises (man-made) vitreous wool, also referred to as mineral wool composed of (man-made) vitreous fibres (MMVF) bonded together. This type of mineral fibre product are typically made by converting a melt made of suitable raw materials to fibres in conventional manner, for instance by a spinning cup process or by a cascade rotor process. The fibres or threads are blown into a forming chamber and, while airborne and while still hot, are sprayed with a binder solution and randomly deposited as a mat or web onto a travelling conveyor. The fibre mat is then transferred to a curing oven where heated air is blown through the mat to cure the binder and rigidly bond the mineral fibres together. Preferably, at least a fraction of the man-made vitreous fibres (MMVF) are made of at least one material selected from the group consisting of mineral wool and/or mineral fibres, including stone wool, mineral wool, slag wool, basalt wool, dolomite wool, diabase wool, volcanic wool, ceramic fibres, and glass fibres. The stone or (volcanic) rock based ingredients can be obtained directly from nature. Slag wool is typically made from recycled waste product of a blast furnace. Glass wool is typically made from a mixture of natural and recycled glass, for example obtained from recycled bottles, car windscreens and window panes. The mineral wools are non-combustible, thermally stable, and moisture-resistant. It retains its properties even in humid conditions. Moreover, sound can be efficiently blocked by mineral wool, which makes mineral wool as a relatively good sound dampening material, which is a beneficial property its use in floor, wall, and ceiling panels. Moreover, it has surprisingly been found that these minerals wools, bonded by a cured thermosetting binder, can be profiled in a very smooth manner which makes this material suitable to have at least a part of each coupling profile integrally formed by the material(s) of the core, in particular at least one wool layer of the core. Due to the non-brittle, tough material properties of said wool layer(s), the risk of damaging the coupling profiles during or after manufacturing can be kept to a minimum, which makes the panel according to the invention ideally suitable to compose, in a durable and reliable manner, a floating floor covering consisting of interlocked panels according to the invention. This is a great advantage over today's SPC panels. The core may also be referred to as a substrate of the panel.

The (mineral) wool layer is also referred to as (mineral) wool mat or (mineral) wool web, and is typically a three-dimensional layer having a thickness of at least 2 mm, preferably a thickness of between 2 and 12 mm, more preferably a thickness of between 3 and 10 mm. In this layer vitreous fibres may have an at least partially vertical orientation and/or may be stacked on top of each other.

Preferably, in at least one wool layer the amount (in weight percent) of vitreous fibres exceeds the amount (in weight percent) of cured thermoset polymeric binder material. Preferably, in at least one wool layer the amount of vitreous fibres is between 75 and 95 percent by weight, more preferably between 80 and 90 percent by weight. Preferably, in at least one wool layer the amount of binder material is between 5 and 20 percent by weight, more preferably between 10 and 17 percent by weight. The wool layer may comprise traces of other materials and/or may comprises one or more additives, like colorants and/or fillers.

Addition of the binder is preferably carried out under conditions that allow the binder to be uniformly distributed over the vitreous fibres. In particular, it is preferred to prevent the formation of fibre bundles, this binder or these binders being dispersed within non-bonded fibres that are liable to easily break and thereby generate dust. This operation aims at retaining fibres that are bonded together by junction points that are sufficiently strong to ensure good cohesion and to ensure that the product does not tear when used. However, the cohesion is preferably not too high, so that the bonding remains flexible and the final product retains a certain deformability. In particular, the junctions between the fibres must provide a network that is stable and rigid enough to withstand the compression imposed by storing and transporting the product and during its normal use as (floor) panel. Normally, the binder is supplied very close to the fibre-forming device. The reason for applying the binder to the suspended fibres, and not to the mat already formed on the receiving conveyor is that it is difficult to have the binder penetrate into a mineral wool mat since such mats are tight and the fibres have a fine structure compared to the size of the binder drops.

Curing of the mineral fibre web (mineral wool) may be carried out in a curing oven by introducing a hot-air stream into the mineral fibre web. However, at the entrance of the curing oven where the uncured and thus soft mineral fibre web is introduced into the oven, there often occurs the problem that the hot-air stream may be of a magnitude that holes or depressions are formed in the mineral fibre web (so-called "hollow-blowing"), which is undesired since these holes or depressions may be visible in the final panel. As curing takes place along the length of the curing oven, the problem decreases in importance because the stiffness increases and the web gains resistance against the air pressure. The curing quality may be improved by applying one or more co-binders having e.g. a lower T-onset temperature (temperature at which the curing starts) than the T-onset temperature of a main binder, strength is fast built up in the mineral fibre web upon introduction into the curing oven, thereby reducing the risk of the occurrence of hollow-blowing in the non-cured or partly cured sections and improving curing quality and curing rate. Preferably, the core, in particular at least one wool layer, comprises a mixture of binder materials, wherein a first binder material has a higher curing temperature and/or curing rate than at least one second binder material. This allows to use air pressures that would normally cause hollow-blowing which, in turn, increases production capacity. The thermosetting binder material(s) used in the core, in particular in the (mineral) wool layer, may comprise both formaldehyde-containing and formaldehyde-free, organic and inorganic binder resins. Suitable formaldehyde-containing resins are, for instance, phenoplast-type resins (phenol-formaldehyde resins or urea-modified phenol-formaldehyde resins) and aminoplast-type resins (melamine-formaldehyde resins or urea-formaldehyde resins), or combinations thereof. Preferred examples of formaldehyde-free binder materials are described below. Preferably, this binder material comprises the (water-soluble) reaction product of an alkanolamine with a carboxylic anhydride obtainable by reacting at least one alkanolamine with at least one carboxylic anhydride and, optionally, treating the reaction product with a base. Preferred alkanolamines for use in the preparation of this binder materials are alkanolamines having at least two hydroxy groups. Specific examples of suitable alkanolamines are diethanolamine, triethanolamine, diisopropanolamine, triisopropanolamine, methyldiethanolamine, ethyldiethanolamine, n-butyldiethanolamine, methyldiisopropanolamine, ethylisopropanolamine, ethyldiisopropanolamine, 3-amino-1,2-propanediol, 2-amino-1,3-propanediol and tris (hydroxymethyl)aminomethane. Diethanolamine is the currently preferred alkanolamine. The carboxylic anhydride reactant may be selected from saturated or unsaturated aliphatic and cycloaliphatic anhydrides, aromatic anhydrides and mixtures thereof, saturated or unsaturated cycloaliphatic anhydrides, aromatic anhydrides and mixtures thereof being preferred. In a particularly preferred embodiment of the invention, two different anhydrides selected from cycloaliphatic and/or aromatic anhydrides are employed. Other suitable examples of binder materials, which may in particular be used as co-binder are acrylic resin and an epoxy resin. Preferably, the amount of co-binder, based on solids, is 1 to 50 weight percent of the total binder, preferably 5 to 35 weight percent of the total binder.

Preferably, at least one binder material is formed by a sugar component, preferably selected from the group consisting of: sucrose, reducing sugars in particular dextrose, polycarbohydrates, and mixtures thereof. Glucose, also known as dextrose, is formed in plants from carbon dioxide absorbed from the air using sunlight as energy source. Part of the glucose is polymerised into long chains of glucose and stored as starch in granules as a reserve. The viscosity and the content of large polymers in a sugar syrup generally may decrease with an increasing DE value. DE is an abbreviation for Dextrose Equivalent and is defined as the content of reducing sugars, expressed as the number of grams of anhydrous D-glucose per 100 g of the dry matter in the sample, when determined by the method specified in International Standard ISO 5377-1981 (E). Hydrolytic cleavage of the starch may be stopped at different stages of the process resulting in carbohydrate mixtures (sugar syrups) having different DE numbers, i.e. having different molecular weight distribution and different reactivity. Only glucose syrup of high DE can crystallise easily and yield a product in powder or granular form. A most popular crystallised product is dextrose monohydrate with application in medicine and chewing tablets. Dextrose monohydrate is pure glucose (DE 100). A large content of polymers should preferably be avoided for a mineral wool binder material because this will provide a more sticky binder resulting in stickiness of the formed mineral wool layer (wool mat or binder-containing web) to the manufacturing equipment such as e.g. the forming chamber walls, the travelling conveyors, rollers and pendulums. The solubility of the binder solution containing a sugar syrup may increase with increasing DE value. The binder solution must be sufficiently water soluble to provide a homogenous distribution of the binder on the mineral fibres making up the mineral wool mat or web to be cured. Preferably, the binder material comprises an aqueous binder composition comprising a sugar syrup containing a reducing sugar having a dextrose equivalent DE of 50 to less than 85. This will typically provide excellent products fulfilling the many demands to the binder in a mineral wool production line and the demands to the products obtained by using the binder.

Insufficient curing may also occur throughout the whole wool layer. This may e.g. be the case where the production line has a production change from one product type to another and where the curing settings needs to be changed. For example, changing from a low binder content product to a high binder content product, or vice versa. During the run-in of the line, the curing settings may not be optimal and insufficient curing occurs. Another problem that may occur during the production of mineral fibre products are anomalies of the binder distribution like the agglomeration of large amounts of binder material in a single part of the wool layer, which affects the properties and is therefore undesired. The curing process can be monitored more closely by adding at least one fluorescent compound to the core, in particular to the wool layer, more in particular to the binder material of the wool layer. Quenching of the fluorescence by the binder material is influenced by the curing. For the purpose of the present invention, the term "cured or partly cured binding material" refers to a binder which has at least been cured to a certain degree, e.g. by thermally treating in a curing apparatus, but has not necessarily been treated to achieve full curing in all regions of the product. By visual inspection, the presence or absence and/or pattern of fluorescence on the surface of the wool layer and/or a colour change can be detected. In this way, irregularities in curing or anomalies of the binder material can therefore immediately be detected and the production process can therefore be re-adjusted quickly, thereby minimizing the wastage of inadequate wool layers. While in principal, any of the fluorescent compounds can be used in any amount in the panel, in particular the core, more in particular the wool layer according to the present invention, particularly good results have been achieved when the liquid mixture comprises a fluorescent compound selected from the group consisting of one or more xanthenes, such as fluorescein sodium salt, 2',7'-dichlorofluorescein, rhodamine B, rhodamine 6G, eosin Y disodium salt (2',4',5',7',-tetrabromofluorescein disodium salt), sulforhodamine B;

one or more acridines, such as acridine orange (3,6-bis (dimethylamino)acridine), acridine yellow G (3,6-diamino-2,7-dimethylacridine hydrochloride); quinine and/or one or more quinine derivatives, such as in form of a quinine containing tonic water;

one or more coumarins, such as umbelliferone (7-hydroxycoumarin); one or more arylsulfonates, such as pyranine (8-hydroxypyrene-1,3,6-trisulfonic acid trisodium salt). Experiments have shown that well-cured areas (brownish) as well as binder free areas (white) appeared "as usual" in daylight and were nonfluorescent under 365 nm UV light. Areas with uncured binder were easily detected—and distinguished from binder free areas— under 365 nm UV light by the presence of pink-orange fluorescence and under daylight by the presence of pink coloration: the presence of uncured binder as a result of for example shot nests were detected. Even small uncured spots not visible to the naked eye in daylight were efficiently detected under 365 nm UV light.

Preferably, the core, in particular at least one wool layer, comprises aerogel particles. Aerogel is a synthetic porous ultralight material derived from a gel, in which the liquid component for the gel has been replaced with a gas without significant collapse of the gel structure, resulting in a solid with extremely low density, and with a beneficial vapor permeability. More preferably, the weight of aerogel particles in the core exceeds the weight of the binder material and/or the weight of the man-made vitreous fibres in the core. Hence, preferably a relatively large weight (and amount) of aerogel particles is used, which could significantly reduce the weight and density of the core, and hence of the panel as such. This results in the use of less binder material, which is favourable from a cost point of view. The aerogel particles are kept entrapped in a vitreous fibre "cage", where the fibres are connected by the binder material at junctions between fibres. Thereby the aerogel particles are kept inside the wool layer.

During production the orientation of the fibres in the wool layer(s) can be adjusted. For one of the intended uses of the panel, in particular as floor panel, it is favourable in case at least one wool layer comprises fibres, wherein the fibre orientation is substantially vertical and/or in a vertical-chaotic manner. Here, the vertical component of the fibre orientation is dominant over the horizontal component of the fibre orientation. This will increase the compression strength of the wool layer. This does not exclude that it is imaginable that the fibre orientation in at least one wool layer of the core could be substantially horizontal. It is imaginable that the core comprises at least one base wool layer comprising a first mineral wool, and at least one top wool layer, positioned on top of said base wool layer, comprising a second mineral wool. The first and second mineral wool may be the same. However, preferably the first wool and the second wool have different material compositions and/or different structural properties, such as different fibre orientations.

In general when terms like "horizontal" and "vertical" or similar directional references are used in the present disclosure, these terms are meant to be understood as relative terms e.g. where the term "vertical" refers to a direction perpendicular to the plane defined by the panel and "horizontal" refers to a direction coinciding with or parallel to said plane of the panel.

Preferably, the panel, in particular the core, more in particular at least one wool layer, comprises at least one reinforcement layer, preferably a non-woven layer or woven layer, in particular a cloth. Each reinforcement layer preferably has a thickness of 0.2-0.4 mm. It is conceivable that the core has a multi-layer structure, wherein at least one reinforcing layer is enclosed in between two other layers of the panel, in particular of the core. Preferably, the density of the reinforcing layer is situated between 1.000 and 2.000 kg/m3, preferably between 1.400- and 1.900 kg/m3, and more preferably between 1.400 and 1.700 kg/m3. The reinforcement layer may comprise natural fibers, such as but not limited to jute, and/or may comprise synthetic fibres, such as polymer fibres, in particular nylon fibres; glass fibres; or carbon fibres. It is imaginable that at least one reinforcement layer is embedded in at least one wool layer and, preferably in between two wool layers stacked on top of each other. It is imaginable that the panel comprises a plurality of reinforcement layers, wherein, preferably, at least one first reinforcement layer is located in a top portion of the core, and wherein at least one second reinforcement layer is located in a bottom portion of the core.

Preferably, at least one core, in particular at least one wool layer, has a density lower than 1,200 kg/m3. In case aerogel particles are applied, a relatively low density of approximately 80-100 kg/m3 could be obtained. Typically, the density is situated between 130 and 1,050 kg/m3. Preferably, at least one core, in particular at least one wool layer, has an area density lower than 12 kg/m2, preferably lower than 10 kg/m2.

Preferably, the coefficient of thermal expansion coefficient of the panel, preferably the core, more preferably at least one wool layer, in at least one direction is below 0.03 mm/m/10° C., preferably below 0.02 mm/m/10° C. This thermal expansion coefficient preferably applies both to the longitudinal direction and to the transversal direction of the panel, preferably the core, more preferably at least one wool layer.

Preferably, the Young's modulus of at least one wool layer is situated between 3,500 and 5,200 MPa, more preferably between 4,000 and 4,500 MPa. The Flexural strength of at least one wool layer is preferably situated between 40 and 50 MPa, more preferably between 43 and 48 MPa.

Preferably, the decorative top structure is adhered onto the core by means of an adhesive, in particular a waterproof adhesive. This prevents that the top structure easily delaminates from the core upon wetting. An example of a suitable adhesive is a polyurethane adhesive. It is alternatively or additionally also imaginable that the decorative top structure is adhered to the core by means of pressing, in particular heat-pressing, such as calendering.

Preferably, an adhesive is used which loses its adhesion at a predetermined temperature, more preferably an adhesive which loses its adhesion between 80 and 120 degrees Celsius. Such adhesive would allow to separate the core and the top structure such that both parts can be recycled separately. In addition, the use of such adhesive allows an exchange of a damaged top structure by (locally) heating the panel, typically to a temperature between 80 and 120 degrees Celsius, such that the top layer can be exchanged without having to remove multiple panels. Preferably, the adhesive layer is a flexible layer configured to withstand (linear) expansion and contraction differences between the core and the top structure. Preferably, a hot melt adhesive (thermoplastic adhesive) is used. The invention also relates to the use of an adhesive, in particular a hot melt adhesive, which loses its adhesion at least partially and/or has a reduced bond strength, at an elevated temperature, preferably between 80 and 120 degrees Celsius, for gluing a decorative top structure, either directly of indirectly, onto the core to construct a decorative panel, in particular a decorative panel according to the invention. Such an adhesive facilitates delamination of the panel for recycling purposes.

Some of the possible base materials of suitable adhesives include the following:

Ethylene-vinyl acetate (EVA) copolymers, which typically leads to a low-performance, low-cost hot melt adhesive. They provide sufficient strength between 15 and 50° C. but are limited to use below 60-80° C. and have low creep resistance under load. The vinyl acetate monomer content is preferably about 18-29 percent by weight of the polymer. High amounts of tackifiers and waxes are often used; an example composition is 30-40% of EVA copolymer (provides strength and toughness), 30-40% of tackifier resin (improves wetting and tack), 20-30% of wax (usually paraffin-based; reduces viscosity, alters setting speed, reduces cost), and 0.5-1.0% of stabilizers. Fillers can be added Lower molecular weight chains provide lower melt viscosity, better wetting, and better adhesion to porous surfaces. Higher molecular weight chains provide better cohesion at elevated temperatures and better low-temperature behaviour. Increased ratio of vinyl acetate lowers the crystallinity of the material, improves optical clarity, flexibility and toughness, and worsens resistance to solvents. EVA can be crosslinked by, e.g., peroxides, yielding a thermosetting material. EVAs can be compounded with aromatic hydrocarbon resins. Grafting butadiene to EVA improves its adhesion. Its dielectric properties are poor due to high content of polar groups, the dielectric loss is moderately high, which renders this material less preferable in case well-insulated floor panels would be needed, EVAs are optically clearer and more gas and vapor permeable than polyolefins;

Ethylene-acrylate copolymers have lower glass transition temperature and higher adhesion even to difficult substrates, compared to EVA. These copolymers exhibit a better thermal resistance, increased adhesion to metals and glass, compared to EVA. Suitable for low temperature use. Ethylene-vinylacetate-maleic anhydride and ethylene-acrylate-maleic anhydride terpolymers offer very high performance. Examples are ethylene n-butyl acrylate (EnBA), ethylene-acrylic acid (EAA) and ethylene-ethyl acetate (EEA).

Polyolefins (PO) (polyethylene (usually LDPE but also HDPE, which has a higher melting point and better temperature resistance), atactic polypropylene (PP or APP), polybutene-1, oxidized polyethylene, etc.), low-performance, for difficult-to-bond plastics. Very good adhesion to polypropylene, good moisture barrier, chemical resistance against polar solvents and solutions of acids, bases, and alcohols. Longer open time in comparison with EVA and polyamides. Polyolefins have low surface energy and provide good wetting of most metals and polymers. Metallocene-catalyst-synthesised polyolefins have a narrow distribution of molecular weight and correspondingly narrow melting temperature range. Due to the relatively high crystallinity, polyethylene-based glues tend to be opaque and, depending on additives, white or yellowish. Polyethylene hot melts have high pot life stability, are not prone to charring, and are suitable for moderate temperature ranges and on porous non-flexible substrates. Nitrogen or carbon dioxide can be introduced into the melt, forming a foam which increases spreading and open time and decreases transfer of heat to the substrate, allowing use of more heat-sensitive substrates; polyethylene-based HMAs are usually used. PE and APP are usually used on their own or with just a small amount of tackifiers (usually hydrocarbons) and waxes (usually paraffins or microcrystalline waxes, for lower cost, improved anti-blocking, and altered open time and softening temperature). The molecular weight of the polymer is usually lower. Lower molecular weights provide better low-temperature performance and higher flexibility, higher molecular weights increase the seal strength, hot tack, and melt viscosity.

Polybutene-1 and its copolymers are soft and flexible, tough, partially crystalline, and slowly crystallizing with long open times. The low temperature of recrystallization allows for stress release during formation of the bond. Good bonding to nonpolar surfaces, worse bonding to polar ones. Good for rubber substrates, and can be formulated as pressure-sensitive.

Amorphous polyolefin (APO/APAO) polymers are compatible with many solvents, tackifiers, waxes, and polymers; they find wide use in many adhesive applications.

APO hot melts have good fuel and acid resistance, moderate heat resistance, are tacky, soft and flexible, have good adhesion and longer open times than crystalline polyolefins. APOs tend to have lower melt viscosity, better adhesion, longer open times and slow set times than comparable EVAs. Some APOs can be used alone, but often they are compounded with tackifiers, waxes, and plasticizers (e.g., mineral oil, polybutene oil). Examples of APOs include amorphous (atactic) propylene (APP), amorphous propylene/ethylene (APE), amorphous propylene/butene (APB), amorphous propylene/hexene (APH), amorphous propylene/ethylene/butene. APP is harder than APE, which is harder than APB, which is harder than APH, in accordance with decreasing crystallinity. APOs show relatively low cohesion, the entangled polymer chains have fairly high degree of freedom of movement. Under mechanical load, most of the strain is dissipated by elongation and disentanglement of polymer chains, and only a small fraction reaches the adhesive-substrate interface. Cohesive failure is therefore a more common failure mode of APOs.

Polyamides and polyesters, high-performance

Polyamides (PA), high-performance, for severe environments; high-temperature glues; typically applied at over 200° C., but can degrade and char during processing. In molten state can somewhat degrade by atmospheric oxygen. High application temperature. High range of service temperatures, generally showing adequate bonding from −40 to 70° C.; some compositions allow operation to 185° C. if they do not have to carry load. Resistant to plasticizers, therefore suitable for gluing polyvinyl chloride; only polyamides derived from secondary diamines however provide a satisfying bond. Resistant to oils and gasoline. Good adhesion to many substrates such as metal, wood, vinyl, ABS, and treated polyethylene and polypropylene. Three groups are employed, with low, intermediate, and high molecular weight; the low molecular weight ones are low-temperature melting and easy to apply, but have lower tensile strength, lower tensile-shear strength, and lower elongation than the high molecular weight ones. The high molecular weight ones require sophisticated extruders and are used as high-performance structural adhesives. The presence of hydrogen bonds between the polymer chains gives polyamides a high strength at even low molecular weights, in comparison with other polymers. Hydrogen bonds also provide retention of most of the adhesive strength up almost to the melting point; however they also make the material more susceptible to permeation of moisture in comparison with polyesters. Can be formulated as soft and tacky or as hard and rigid. Niche applications, together with polyesters taking less than 10% of total volume of hot melt adhesives market. Absorption of moisture may lead to foaming during application as water evaporates during melting, leaving voids in the adhesive layer which degrade mechanical strength. Polyamide HMAs are usually composed of a dimer acid with often two or more different diamines. The dimer acid usually presents 60-80% of the total polyamide mass, and provides amorphous nonpolar character. Linear aliphatic amines such as ethylene diamine and hexamethylene diamine, provide hardness and strength. Longer chain amines such as dimer amine, reduce the amount of hydrogen bonds per volume of material, resulting in lower stiffness. Polyether diamines provide good low-temperature flexibility. Piperazine and similar diamines also reduce the number of hydrogen bonds. Only polyamides based on piperazine and similar secondary amines form satisfactory bond with polyvinyl chloride; primary amines form stronger hydrogen bonds within the adhesive, secondary amines can act only as proton acceptors, don't form hydrogen bonds within the polyamide, and are therefore free to form weaker bonds with vinyl, probably with the hydrogen atom adjacent to the chlorine.

Polyesters, similar to the ones used for synthetic fibers. High application temperature. Synthetized from a diol and a dicarboxylic acid. The length of the diol chain has major influence to the material's properties; with increasing diol chain length the melting point increases, the crystallization rate increases, and the degree of crystallization decreases. Both the diol and acid influence the melting point. In comparison with similar polyamides, due to absence of hydrogen bonds, polyesters have lower strength and melting point, but are much more resistant to moisture, though still susceptible. In other parameters, and in applications where these factors do not play a role, polyesters and polyamides are very similar. Polyesters are suitable for bonding fabrics. They can be used on their own, or blended with large amounts of additives. They are used where high tensile strength and high temperature resistance are needed. Most polyester hot melt adhesives have high degree of crystallinity. Polyesters are often highly crystalline, leading to narrow melting temperature range, which is advantageous for high-speed bonding.

Polyurethanes

Thermoplastic polyurethane (TPU) offer good adhesion to different surfaces due to presence of polar groups. Their low glass transition temperature provides flexibility at low temperatures. They are highly elastic and soft, with wide possible crystallization and melting point ranges. Polyurethanes consist of long linear chains with flexible, soft segments (diisocyanate-coupled low-melting polyester or polyether chains) alternating with rigid segments (diurethane bridges resulting from diisocyanate reacting with a small-molecule glycol chain extender). The rigid segments form hydrogen bonds with rigid segments of other molecules. Higher ratio of soft to hard segments provides better flexibility, elongation, and low-temperature performance, but also lower hardness, modulus, and abrasion resistance. The bonding temperature is lower than with most other HMAs, only about 50-70° C., when the adhesive behaves as a soft rubber acting as a pressure-sensitive adhesive. The surface wetting in this amorphous state is good, and on cooling the polymer crystallizes, forming a strong flexible bond with high cohesion. Choice of a proper diisocyanate and polyol combination allows tailoring the polyurethane properties; they can be used on their own or blended with a plasticizer. Polyurethanes are compatible with most common plasticizers, and many resins.

Polyurethanes (PUR), or reactive urethanes, for high temperatures and high flexibility. Solidification can be rapid or extended in range of several minutes; secondary curing with atmospheric or substrate moisture then continues for several hours, forming cross-links in the polymer. Excellent resistance to solvents and chemicals. Low application temperature, suitable for heat-sensitive substrates. Heat-resistant after curing, with service temperatures generally from −30° C. to +150° C. Ink-solvent resistant. Usually based on prepolymers made of polyols and methylene diphenyl diisocyanate (MDI) or other diisocyanate, with small amount of free isocyanate groups; these groups when subjected to moisture react and cross-link. The uncured solidified "green" strength tends to be low than non-reactive HMAs, mechanical strength develops with curing. Green strength can be improved by blending the pre-polymer with other polymers. Since PUR is highly flexible and has a broad thermal setting range, PUR is perfect for bonding difficult substrates.

Styrene block copolymers (SBC), also called styrene copolymer adhesives and rubber-based adhesives, have good low-temperature flexibility, high elongation, and high heat resistance. Frequently used in pressure-sensitive adhesive applications, where the composition retains tack even when solidified; however non-pressure-sensitive formulations are also used. High heat resistance, good low-temperature flexibility. Lower strength than polyesters. They usually have A-B-A structure, with an elastic rubber segment between two rigid plastic endblocks. High-strength film formers as standalone, increase cohesion and viscosity as an addi-tive. Water-resistant, soluble in some organic solvents; cross-linking improves solvent resistance. Resins asso-ciating with endblocks (cumarone-indene, α-methyl styrene, vinyl toluene, aromatic hydrocarbons, etc.) improve adhesion and alter viscosity. Resins associat-ing to the midblocks (aliphatic olefins, rosin esters, polyterpenes, terpene phenolics) improve adhesion, processing and pressure-sensitive properties. Addition of plasticizers reduces cost, improves pressure-sensi-tive tack, decrease melt viscosity, decrease hardness, and improve low-temperature flexibility. The A-B-A structure promotes a phase separation of the polymer, binding together the endblocks, with the central elastic parts acting as cross-links; SBCs do not require addi-tional cross-linking.

Styrene-butadiene-styrene (SBS), used in high-strength PSA (pressure-sensitive adhesive) applications.

Styrene-isoprene-styrene (SIS), used in low-viscosity high-tack PSA applications.

Styrene-ethylene/butylene-styrene (SEBS), used in low self-adhering non-woven applications.

Styrene-ethylene/propylene (SEP)

Polycaprolactone with soy protein, using coconut oil as plasticizer, a biodegradable hot-melt adhesive Polycarbonates Fluoropolymers, with tackifiers and ethylene copolymer with polar groups Silicone rubbers, undergo cross-linking after solidifica-tion, form durable flexible UV and weather resistant silicone sealant Thermoplastic elastomers Polypyrrole (PPY), a conductive polymer, for intrinsically conducting hot melt adhesives (ICHMAs), used for EMI shielding. EVA compounded with 0.1-0.5 wt. % PPY are strongly absorbing in near infrared, allowing use as near-infrared activated adhesives.

various other copolymers.

The adhesive may be enriched with one or more additives. Examples of such additives include the following:

tackifying resins (e.g., rosins and their derivates, terpenes and modified terpenes, aliphatic, cycloaliphatic and aromatic resins (C5 aliphatic resins, C9 aromatic resins, and C5/C9 aliphatic/aromatic resins), hydrogenated hydrocarbon resins, and their mixtures, terpene-phenol resins (TPR, used often with EVAs)), up to about 40%. Tackifiers tend to have low molecular weight, and glass transition and softening temperature above room tem-perature, providing them with suitable viscoelastic properties. Tackifiers frequently present most of both weight percentage and cost of the hot-melt adhesive.

waxes, e.g., microcrystalline waxes, fatty amide waxes or oxidized Fischer-Tropsch waxes; increase the setting rate. One of the key components of formulations, waxes lower the melt viscosity and can improve bond strength and temperature resistance.

plasticizers (e.g., benzoates such as 1,4-cyclohexane dimethanol dibenzoate, glyceryl tribenzoate, or pen-taerythritol tetrabenzoate, phthalates, paraffin oils, polyisobutylene, chlorinated paraffins, etc.) antioxi-dants and stabilizers (e.g., hindered phenols, BHT, phosphites, phosphates, hindered aromatic amines); added in small amounts (<1%), not influencing physi-cal properties. These compounds protect the material from degradation both during service life, compound-ing and in molten state during application. Stabilizers based on functionalized silicones have improved resis-tance to extraction and outgassing.

UV stabilizers protect the material against degradation by ultraviolet radiation pigments and dyes, glitter biocides for hindering bacterial growth flame retardants antistatic agents fillers, for reducing cost, adding bulk, improving cohesive strength (forming an aggregate-matrix composite mate-rial) and altering properties; e.g., calcium carbonate, barium sulfate, talc, silica, carbon black, clays (e.g., kaolin).

Fugitive glues and pressure-sensitive adhesives are avail-able in hot-melt form. With a tack-like consistency, PSA are bonded through the application of pressure at room tem-perature. Additives and polymers containing unsaturated bonds are highly prone to autoxidation. Examples include rosin-based additives. Antioxidants can be used for sup-pressing this aging mechanism. Addition of ferromagnetic particles, hygroscopic water-retaining materials, or other materials can yield a hot melt adhesive which can be activated by microwave heating. Addition of electrically conductive particles can yield conductive hot-melt formu-lations.

In another preferred embodiment, the decorative top structure is fused onto the core, preferably without using a separate adhesive. This may, for example, be realized by using a thermoplastic layer or film as bottom layer of the decorative top structure, which may be heated and subse-quently fused or welded to the core. Alternatively or addi-tionally, this may, for example, also be realized by applying a core having a softenable upper surface, in particular by applying a core comprising a thermoplastic top layer; and/or by having a top side of the core formed by an at least partially uncured wool layer, wherein at least a part of the top structure is applied onto said uncured top side of the core, after which the core is cured by means of (ir)radiation, such as heat and/or UV radiation. In case the top structure is provided with a cureable layer, such as an (UV) hardenable lacquer layer, it is imaginable that during production a single curing step is applied to cure both the core and the top structure.

It is (also) conceivable that the lower side of the decora-tive top structure penetrates into an upper side of the core and/or that the upper side of the core penetrates into a lower side of the decorative top structure, preferably over a depth greater than 0.1 millimetre. In case the decorative top structure penetrates into an upper side of the core, this can be realized, for example, by applying a decorative top structure comprising as bottom layer a thermoplastic layer and/or a primer layer and/or an adhesive layer. In particular in case of an adhesive layer, the adhesive is typically applied in liquid state, a certain penetration and (further) reinforcement of the core, in particular of at least one wool layer, and/or of one or more further layers of the decorative top structure can be achieved. A penetration and reinforcement of the core by a penetrated part of the decorative top structure is in particular advantageous at the lateral edge(s) of the core, in particular at the lateral edge(s) at which a groove or recess is applied. According to this embodiment, also an improved laminating strength between the core and the decorative top structure can be achieved. In this case, the risk of tearing between the core and the top structure, or splitting, can be reduced. The decorative top structure preferably penetrates the upper side of the core (and/or vice versa) on the entire interface formed between the core and the decorative top structure or on at least 50 percent of said interface. The achieved penetration depth preferably is greater than 1 percent of the thickness of the core. In case a multi-layer core is used, the achieved penetration depth preferably is greater than 10 percent of the thickness of an upper layer of the core. It was found that a panel according to the embodiment typically exhibits an (highly) increased impact resistance of the panel as such, which is in particular favourable for the decorative top structure and the coupling profiles of the panel. Moreover, with a panel according to this embodiment it is possible to improve the impact resistance of the panel without the necessity to add further rigid or resilient reinforcing elements like a rubber layer, a fiberglass layer, or metal plates. In fact, by applying at least two partially overlapping (interlacing or interweaving) layers of the panel, in particular by allowing at least one layer to penetrate into another layer, the transmission and dissipation of the impact stress through the panel can be improved significantly so that a lower portion of said energy is absorbed by the decorative layer improving the impact resistance thereof. Since it is not necessary to add rigid reinforcing elements, the resulting panel can be made lighter and thinner. Moreover, the penetration of one layer into at least one other layer, the propagation of cracks in the core and/or the decorative top structure could be hindered. Furthermore, in case of superficial cracks of the core and/or decorative top structure, the partially penetrated, bonding layer, such as an adhesive layer could keep the core and the decorative layer itself coherent, and preferably compacted, thereby disguising the visual appearance of the superficial cracks.

The decorative top structure preferably has a thickness between 0.5 to 12 millimeters, preferably between 1 and 6 millimeters, more preferably between 2 and 4 millimeters. It is experimentally found that the core can provide sufficient support for any top layer when having a thickness between 0.5 and 12 millimeters.

The decorative top structure can be of various nature. The top structure may be a single layer or a multi-layer top structure, wherein at least one (top) layer of the top structure is formed by a slab and/or a tile and/or other (thinner or thicker) layer, in particular a coating or a veneer layer. In a preferred embodiment, at least one layer of the top structure and/or top structure as such is at least partially made of a glaze and/or ceramic and/or stone, and/or any material chosen from the group consisting of: polymer, linoleum, ceramic, stone, concrete, mineral porcelain, glass, quartz, soapstone, mosaic, granite, limestone and marble. These materials may be solid or may be porous at least to some extent. In case a glaze is applied, this glaze may be transparent or semi-transparent. Typically, said glaze is a ceramic glaze, which is an impervious layer or coating of a vitreous substance which has been fused to a ceramic body through firing. This glaze can be coloured and/or have a decorative character, and is typically waterproof. Raw materials of ceramic glazes generally include silica, which will be the main glass former. Various metal oxides, such as sodium, potassium, and calcium, may act as flux and therefore lower the melting temperature. Alumina, often derived from clay, is preferably used to stiffen the molten glaze to prevent it from running off the piece. Colorants, such as iron oxide, copper carbonate, or cobalt carbonate, and sometimes opacifiers like tin oxide or zirconium oxide, are used to modify the visual appearance of the fired glaze. In case at least one layer of the top structure is at least partially made of a polymer, this can be a soft polymer, such as rubber or any other (soft) thermoplastic or thermosetting polymer; or a harder polymer, such as ultra-high-molecular-weight polyethylene (UHMWPE, UHMW) or any other (harder) thermoplastic or thermosetting polymer. Linoleum, commonly shortened to lino, is a polymer based composite comprising solidified linseed oil (linoxyn), and pine resin, and preferably wood dust, such as ground cork dust and/or sawdust, and optionally mineral fillers such as calcium carbonate. The slab and/or a tile and/or other (thinner or thicker) layer, in particular a coating or a veneer layer, of the top structure, may be glued and/or fused to another layer of the top structure and/or to the core. Here, it is conceivable that a tile, slab, coating, glaze, or veneer layer is glued onto the core by using an (intermediate) adhesive layer. This adhesive layer may considered as making part of the decorative top structure. Alternatively, it is conceivable that a tile, slab, coating, glaze, or veneer layer is fused (directly) onto the core, e.g. by firing and/or heating and/or curing a laminate of the core and the decorative top structure. Hence, it is imaginable that the panel according to the invention consist of two layers: a core formed by a single wool layer (provided with coupling profiles); and a single decorative top layer fused onto said core.

In case the decorative top structure is at least partially composed of a glaze and/or a ceramic material, this top structure can and typically will become stained by scum and films of biologic origin, such as bacteria, fungus, mold, mildew, in the course of time. The traditional method of removing biological scum and film from this top structure is to clean the top structure by using a cleaning agent. However, preferably and in general, the decorative top structure is provided with a built-in protection against the growth and proliferation of microbes. However, in particular the top structure is at least partially made of a glaze and/or ceramic material, the high temperatures (typically between 800° C. and 1500° C.) used in required ceramic firing processes typically preclude the use of organic biocidal agents. Apart from the required heat resistance, incorporation of solely silver-based biocidal agents into ceramic glazes routinely presents issues of clouding, crazing, discoloration, and other undesirable (physical and/or structural) consequences to the glaze aesthetics. The same problems typically arise with the addition of solely zinc oxide to the glaze or the ceramic frit (prior to firing). The glaze and/or ceramic based top structure, which might be a coating and/or a thin layer, therefore preferably is provided with a persistent built-in biocidal protection while being aesthetically and optically neutral. In a preferred embodiment of the panel according to the invention, the decorative top structure is at least partially compose of a glaze and/or a ceramic material, wherein at least one antimicrobial composition is dispersed (in-mixed) in said glaze and/or ceramic material. Preferably, said antimicrobial composition comprises at least one metal or metal containing compound selected from the group consisting of $Cu_2O$, $Cu(OH)_2$, $Cu$, $CuO_3$, $Cu_2O_3$, and a combination thereof, and at least one non-copper metal or non-copper containing metal compound. Preferably, the non-copper metal containing compound is selected from the group consisting of a silver-containing compound, a barium-containing compound, a bismuth-containing compound, a tin-containing compound, a titanium-containing compound (e.g. $TiO_2$), a zinc-containing compound, and a combination thereof. Here, said silver-containing compound is preferably selected from the group consisting of AgO, $Ag_2O$, $Ag_2CO_3$, $AgNO_3$, and a combination thereof. The barium-containing compound may be for example Ba, $BaCO_3$, or a combination thereof. The bismuth-containing compound may be for example Bi, $Bi_2O_3$, or a combination thereof. The tin-containing compound may be for example SnO2. The zinc-containing compound is preferably Zn, ZnO, or a combination thereof. Preferably, the non-copper metal-containing compound is present in a glaze base and/or ceramic base in a range of at least 0.1% by weight, more preferably in a range of 1 to 10% by weight. Preferably, the metallic copper or copper-containing metal compound is present in a glaze base or ceramic base in a range of 1 weight % to 10 weight %. A glaze base and/or ceramic base is a base composition prepared prior to firing. The presence of one or more of these antimicrobial compositions in the glaze and/or ceramic material typically yields to surfaces that are significantly less green or lighter green in colour compared to the situation wherein only copper would be used in the antimicrobial composition. In some embodiments, the use of a second antimicrobial substance, such as zinc oxide, nearly or entirely eliminates the greenish cast that copper addition typically introduces in a fired layer. After firing, the fired layer still possesses a persistent biocidal property, like to ability to quickly kill bacteria and other microbes. The in-mixing of the antimicrobial composition into the glaze and/or ceramic material is normally realized prior to firing, by melting an antimicrobial agent(s) or constituent(s) into a glass (constituting a base composition for the glaze and/or ceramic material), quenching the glass to freeze the amorphous condition, and then grinding to a desired particle size. A fritted antimicrobial composition is a more homogeneous composition. In case the glaze and/or ceramic material based layer of the top structure is glued onto the core, either directly or indirectly, by using an adhesive, this adhesive may be provided with said antimicrobial composition. It is even imaginable that this adhesive is provided with said antimicrobial composition, while the glaze and/or ceramic layer is free of any antimicrobial composition. A second layer of an adhesive composition may be applied over the dry fritted glaze and/or ceramic material. The second adhesive layer preferably employs an adhesive composition including one or more antimicrobial agents, as for example described above and hereinafter. The glaze and/or ceramic material and the one or more adhesive layers are preferably fired in a conventional manner to mature the surface and produce a substrate having a glazed coating on the surface. As a result of the firing step, all layers are combined to form a fired glaze (and/or ceramic) coating layer on the substrate. The antimicrobial composition typically resides on the glassy surface, where it demonstrates its antimicrobial properties.

In a preferred embodiment, the applied antimicrobial composition comprises a first antimicrobial agent consisting of $Ag_2CO_3$ and a second antimicrobial agent that selected from the group consisting of: $Bi_2O_3$, CuO, $SnO_2$, $TiO_2$ and ZnO. Preferably, the first antimicrobial agent is present in the glaze and/or ceramic composition at a concentration of about 2 to 4% by weight of the glaze composition and/or ceramic composition. The second antimicrobial agent is preferably present in the glaze composition and/or the ceramic composition at a concentration of from about 2 to 4% by weight of glaze composition and/or ceramic composition. The combinations of first and second antimicrobial agents, as described herein, achieve superior antimicrobial activity at lower antimicrobial agent concentrations as compared to the antimicrobial capability of either antimicrobial agent alone. Such a superior effect presents a distinct economic advantage and increases the effectiveness of the antimicrobial combination per unit weight. Preferably, the antimicrobial composition is a synergistic antimicrobial composition including a first antimicrobial agent and a second antimicrobial agent, the antimicrobial composition being at least one of: 2% $Ag_2CO_3$+2% $Bi_2O_3$; 2% $Ag_2CO_3$+2% CuO; 2% $Ag_2CO_3$+4% $SnO_2$; 2% $Ag_2CO_3$+2% ZnO; 2% $Ag_2CO_3$+4% ZnO; 2% $Bi_2O_3$+2% CuO; 2% $Bi_2O_3$+4% CuO; 2% CuO+4% $Ag_2CO_3$; 2% CuO+4% $SnO_2$; 2% CuO+ 2% $TiO_2$; 2% CuO+4% $TiO_2$; 2% CuO+4% ZnO; 2% $SnO_2$+4% $Ag_2CO_3$; 2% $SnO_2$+4% CuO; 2% $TiO_2$+4% $Ag_2CO_3$; 2% $TiO_2$+4% CuO; 2% ZnO+4% $Ag_2CO_3$; and/or 2% ZnO+4% CuO.

The above antimicrobial compositions are primarily configured to be mixed with glaze and/or ceramic based material. However, it is also, optionally additionally, conceivable that one or more of the above antimicrobial compositions are applied as coating to one or more layers of the panel, preferably a top surface of the decorative structure, to provide the panel with antimicrobial properties. Hence, in this embodiment the antimicrobial composition is included in a separate (coating) layer. The coating is typically applied after firing of the glaze and/or ceramic material. The coating step is typically considered as a post-treatment, which is typically realized prior to use and prior to packing the panel(s).

In case the antimicrobial composition is applied as coating and/or does not have to be subjected to a firing process, e.g. in case an alternative decorative top structure, such as a polymer based decorative top structure, alternative antimicrobial compositions may be used. It is for example imaginable that at least one panel layer, in particular at least one core layer and/or the decorative top structure, comprises and/or is coated with at least one antimicrobial agent, preferably selected from (i) organic or organometallic antimicrobial substances such as halogenated phenyl ethers, halogenated salicylanilides, sesquiterpene alcohols, halogenated carbanilides, bisphenolic compounds, general phenols, formaldehyde, quaternary ammonium compounds, pyridine derivatives and hexachlorophene, and/or from (ii) inorganic antimicrobials substance including silver, zinc, or copper in glass or ceramic matrices, wherein the antimicrobial agent preferably comprises 2,4,4'-trichloro-2'-hydroxydiphenyl ether. Said antimicrobial agent may also be a chemical selected from the group consisting of triclosan, ortho phenyl phenol, diiodomethyl p-tolylsulfone, zinc pyrithiones, sodium pyrithiones, azoles, such as propiconazoles, poly(hexamethylene biguanide) hydrochloride, 3,4, 4'trichlorocarbanilide, barium mono hydrate and silver, copper or zinc in zeolite or amorphous glass powder.

In a preferred embodiment, the decorative top structure comprises graphene and/or at least one derivative of graphene. It has been found that by incorporating graphene and/or at least one derivate of graphene in the decorative top structure, the hardness, and hence the indentation and impact resistance of the top structure, and hence of the decorative panel as such, can be increased significantly.

Graphene is a two dimensional layer of carbon atoms, arranged in the form of a honeycomb lattice. This thin, one atom thick lattice is relatively strong, flexible, light-weight, and easy to process, which makes this material very suitable to be incorporated in a decorative panel according to the invention to improve its impact resistance. Moreover, graphene also exhibits excellent heat and electricity conducting properties, which beneficial properties may also be used to further improve the decorative panel according to the invention, as will be elucidated below in more detail. Moreover, graphene and/or derivatives of graphene display excellent anti-oxidant and scratch-resistant properties. Furthermore, it was found that the graphene and/or derivatives of graphene exhibit(s) excellent antimicrobial properties, which fulfils the need to improve existing panels which still have the known benefits while reducing the risk of bacteria growth on and/or in between said panels, in order to expand the applicability of the panels.

The most commonly known of graphene derivates are graphene oxide and reduced graphene oxide. Graphene oxide (GO) is a single-atomic layered material, made by the powerful oxidation of graphite, which is relatively cheap and abundantly available. Graphene oxide is an oxidized (and cheaper) form of graphene, laced with oxygen-containing groups. Reduced graphene oxide (RGO) is the form of GO that is processed by chemical, thermal and other methods in order to reduce the oxygen content, while graphite oxide is a material produced by oxidation of graphite which leads to increased interlayer spacing and functionalization of the basal planes of graphite.

As an improved hardness is typically desired across the full upper side of the decorative panel, the graphene and/or graphene derivate(s) preferably covers the substantially entire upper side of the core. This coverage may e.g. be realized by applying a continuous layer, discontinuous layer, overlapping or non-overlapping flakes, of particles composed of graphene and/or at least one graphene derivate.

By using graphene and/or graphene derivate(s), in particular when applied as part of a porous microstructure, in a panel according to the invention, the sound absorption properties, and hence acoustic dampening properties, can be enhanced significantly.

Preferably, the decorative top structure comprises at least two layers of which at least one layer, preferably a substantially transparent or translucent top layer of said top structure, comprises graphene and/or at least one derivative from graphene. The top layer may entirely be composed of graphene and/or at least one derivative from graphene, although it is also imaginable that the top layer comprises a top coating, such as a (hardened or hardenable) lacquer layer or resin layer, wherein the graphene and/or at least one derivative from graphene is/are dispersed and/or at least partially embedded. It is imaginable that the top surface of the decorative top structure is at least partially made from graphene and/or at least one derivative from graphene. It is imaginable that the decorative top structure comprises at least one layer composed of graphene and/or at least one derivative of graphene. Said graphene (derivative) layer can, for example, be a continuous layer or a discontinuous layer or lattice enclosing or provided with one or more fractures. Said at least one layer composed of graphene and/or at least one derivative of graphene may at least partially be enclosed by and/or situated in between two layers of the panel, preferably between two layers of the decorative top structure, such as, for example, the core and a top coating, and/or, a decorative layer and a top coating, and/or the core and a decorative layer, and/or a primer layer and a decorative layer. It is imaginable that the panel, in particular the top structure and/or the core, comprises a plurality of layers, wherein each layer is at least partially composed of graphene and/or at least one graphene derivative.

As addressed above, it is imaginable that at least one layer composed of graphene and/or at least one derivative of graphene is at least partially embedded in at least one other layer of the decorative top structure. This latter layer may also be referred to as matrix layer, which is typically composed of a polymer, such as a PVC or PU, comprising substance. This matrix layer typically substantially entirely encloses the layer composed of graphene and/or at least one derivative of graphene, and may penetrate the layer composed of graphene and/or at least one derivative of graphene, in particular—if applied—fractures (fracture openings) are present in the layer composed of graphene and/or at least one derivative of graphene. Preferably, the thickness of said graphene (derivate(s)) embedded layer is between 0.1 nm and 60 μm, more preferably between 0.1 nm and 50 μm, such as between 0.1 and 1 μm, more preferably such as between 0.2 nm and 0.4 nm. Such a layer can be prefabricated and adhered, typically by gluing and/or fusing, to another panel layer during production of the panel. In case such a layer is produced in-line during the panel production process, it is imaginable that the layer thickness exceeds 50 μm.

It is conceivable that the decorative top structure comprises particles, preferably platelets, such as nanoplatelets, and/or flakes and/or nanoribbons and/or fibres, composed of graphene and/or at least one derivative from graphene. These particles can be randomly distributed in the top structure, although it is commonly preferred to embed said particles in at least one layer of the decorative top structure, preferably at least one polymer layer of the decorative top structure. Preferably, at least a fraction of said particles overlap at least partially, at least as seen from a top view of the panel. It may be preferred to apply elongated and/or circular particles, wherein at least a fraction of said elongated particles overlap at least partially, wherein, more preferably, said overlapping particles have a likewise orientation. In case said particles are incorporated and/or embedded within an extruded polymer based layer, elongated or circular particles may be orientated in substantially the same direction during extrusion of said polymer based layer. This particle orientation will typically be substantially parallel to the extrusion direction, or at least closer to parallel to the extrusion direction than to perpendicular to the extrusion direction, during production of said layer. In this manner a shingle-like structure of graphene (derivate) based particles can be realized, which is in favour of the hardness and impact resistance of the top structure.

The decorative top structure preferably comprises at least one decorative visual print, more preferably a digital decorative print. This print may be applied directly onto the core and/or may be applied on top of a primer layer of the top structure, wherein said primer layer is applied, either directly or indirectly onto the core. The visual print, also referred to as décor image, may be formed by a wood pattern. However, it is well thinkable that the décor image represents another kind of pattern, such as, for example, a customized picture and/or a mosaic pattern or tile pattern. In case of a mosaic pattern or tile pattern, artificial tiles may be depicted which are aesthetically separated by one or more grouts (grout lines).

In a preferred embodiment, the decorative top structure comprises a textured surface, in particular a textured upper surface (defining a top surface of the panel), also referred to as embossing structure. Preferably, the texture surface makes part of at least one transparent and/or translucent layer, in particular at least one wear layer and/or at least one top coating. Preferably a decorative visual print layer is located underneath said at least one transparent and/or translucent layer. This textured surface (relief surface) typically improves the optical and haptic appearance of the decorative layer. Said textured surface comprises a pattern of recesses (indentations or impressions) and/or projections, wherein said pattern is preferably at least partially realized by means of printing, in particular digital printing (i.e. by means of a digital printing technique). Digital printing is a method of printing from a digital-based image directly to a media. This digital image can be a decorative image, such as the aforementioned decorative visual print, but also an image representing another part of the top structure, such as at least one wear layer and/or at least one top coating. The digital image can either be a 2D or a 3D image. By digitally (3D) printing the top structure, an infinite degree of freedom of design of the top structure (and the decorative layer) can be obtained, wherein the top structure (and the decorative layer) moreover can be applied in an accurate manner with a high level of detail, which leads to realistic appearances and unique, one-of-a-kind decorative panels. This result cannot be achieved by means of traditional mechanically impressed covering structures. As printing device(s), for example, one or more inkjet printers and/or laser printers may be used. As indicated above, a substantially transparent or translucent part of the top structure may be partially or entirely digitally printed. The decorative visual print layer is preferably digitally printed. To this end, transparent or translucent, either coloured or non-coloured (transparent), ink may be used. At least one substance, in particular ink, used to realize at least a part of the decorative top structure, may be provided with graphene and/or graphene derivative(s) and/or other (solid) particles. This latter results in the situation that graphene and/or graphene derivative(s) can be applied by means of printing, in particular digital printing, or alternatively by means of spraying, pouring or rolling.

This allows the printed decorative image to remain visible. The printed décor image(s) of the decorative layer(s) may be based on the CMYK colour principle where the white colour is typically provided by the surface of the white base coat (if applied). This is a 4-color setup comprising cyan, magenta, yellow and black. Mixing these together will give a colour space/gamut, which is relatively small. To increase specific colour or the total gamut spot colours may be added. A spot colour may be any colour. One or more additional colours may be applied, such as at least one additional colour selected from the group consisting of: orange, green, blue, red, white, light grey, light magenta, and light cyan. These colours may be used separately or in combinations. The colours are typically mixed and controlled by a combination of software and hardware (print engine/print heads).

Preferably, at least a part of the textured surface of the top structure is aligned in register with at least a part of at least one décor image formed by the decorative print layer, in particular at least one pattern defined by at least one décor image formed by the decorative print layer. By applying an alignment in register, also referred to as embossing in register, a very realistic and/or artistic design and appearance of the panel can be realized. In this manner, for example, a realistic wood nerve pattern can be realized, wherein the decorated printed wood nerves (2D) are in register (in line) with the embossed printed wood nerves (3D). The same effect can, for example, be realized with a stone like design, an animal skin design, etcetera. Also, in case one or more artificial, decorative grout lines are printed, the textured surface may comprise one or more recessed channels directly above said decorative grout lines to realize a realistic appearance of the panel which is practically equal to the surface relief obtained when using real tiles and grouts.

At least a part of the embossing structure (textured surface) of the panel is preferably realized by means of mechanical processing, for example by either milling or cutting away panel and/or by means of position-selective deforming, in particular impressing, panel material. It is additionally or alternatively also imaginable, and even preferable, that at least a part of the embossing structure is realized by digital printing, in particular multi-stage digital printing. This multi-stage digital printing process preferably comprises the sub-steps: a) applying a curable liquid base layer, such as a base ink layer and/or a lacquer layer, directly or indirectly, onto the printed decorative image, which preferably covers the entire printed decorative image, b) position-selectively applying, preferably printing, a liquid embossing ink onto the liquid base ink layer, c) polymerizing the base ink, and preferably the embossing ink, and d) preferably removing at least a part of the polymerized embossing ink, more preferably by means of mechanical processing, such as brushing.

The position-selectively applied, preferably printed, a liquid embossing ink typically acts as mask which prevents and/or inhibits polymerization of the base material of the base layer upon irradiation, in particular upon irradiation by means of UV light, which facilitates subsequent removal of the embossing ink together with an at least partially unhardened portion of the base material (located underneath said embossing ink and/or mixed with said embossing ink). In this manner a high-resolution texture can be created. This process is considered as a negative embossing process, since a base level of a base (ink) layer is position-selectively lowered and/or removed. Alternatively or additionally, the liquid embossing ink is position-selectively printed, directly or indirectly, onto the substrate to create the embossing structure from bottom to top (instead of vice versa), which is considered a positive embossing process. The cured (polymerized) ink of the embossing structure is at least partially transparent and/or translucent.

Typically, the liquid base layer, in particular the base ink layer and/or lacquer layer, can be of various chemical nature. Examples of suitable base materials for the base layer comprise at least one of the following materials: polyurethane, epoxy, acrylate, methacrylate, and/or acrylic resin. In a preferred embodiment the embossing ink is immiscible or partially miscible in the base material and, once polymerized, is mechanically removed from the base material. Thereby the main function of embossing ink is to create a three-dimensional structure without altering the chemical-physical properties of the base material. The polymerized embossing ink is more brittle and/or more liquid than the polymerized base material and thereby can be mechanically removed, together with an uncured part or partially cured part of the base material, from the (cured part of the) base material without damaging it. Consequently, if the base material will mainly be of apolar nature, the embossing ink will preferably be polar and vice versa. In a preferred embodiment of the invention the embossing ink comprises at least one photo-crosslinking resin. To be applied by digital printing, such as inkjet-printing, the embossing ink preferably has a viscosity of 10-15 cps at the operational printing temperature of typically 40-50° C. Consequently, similarly to other formulations (varnishes and inks) photo-crosslinkable by inkjet printing, the embossing ink will be mainly formed by (meth)acrylate and/or vinyl monomers. On the other hand, in order to control the rheology and reach the desired degree of hardness, in addition to the monomers, the embossing ink could also contain acrylate oligomers. In order to obtain a brittle and easily removable formulation, ingredients characterized by a low glass transition temperature can be used, such as isodecyl-acrylate, 2-(2-ethoxyethoxy) ethyl acrylate, octyl-decyl-acrylate, tri-decyl-acrylate, laurylacrylate, diacrylate polyethylene glycols of various molecular weight. In a further preferred embodiment of the invention, the embossing ink has sufficiently high surface tension, with respect to the base material, so as to penetrate into the base material while maintaining the shape and thereby creating detailed structures. If on the contrary the surface tension of the embossing ink were too low with respect to that of the base material, there would be a loss of definition, having as a result the fact that the embossing ink will wet the surface of the base material. In a preferred embodiment of the invention, the embossing ink is able to quickly penetrate and effectively mix with the base material. In another further preferred embodiment of the invention, the embossing ink is able to quickly penetrate and not mix or partially mix with the base material. In a preferred embodiment of the method according to the invention, the embossing ink comprises at least one substance configured to inhibit the polymerization of the base material. After the polymerization, the areas printed with the embossing ink will typically be more brittle than the base material. For example, if the base material is constituted by photo-crosslinking resins, the embossing ink can contain polymerization inhibitors such as UV absorbers for example 2-hydroxyphenyl-benzophenones (BP), 2-(2-hydroxyphenyl)-benzotriazoles (BTZ) and 2-hydroxyphenyl-s-triazines (HPT); stereohindered amines (HALS) for example 2,2,6,6-tetramethyl piperidines (TMP); antioxidants (AO) for example sterically hindered phenols, secondary thioethers, phosphites, stabilizers (in-can stabilizer) for example quinone methide, radical scavengers. In a further embodiment of the invention, the embossing ink once polymerized has a glass transition temperature lower than the base material and, consequently, the areas printed with the embossing ink will be easier to be removed than the polymerized base material. In some embodiments, the embossing ink contains additives which serve to modify properties such as the rheology and/or printability and/or colour and can comprise photo-initiators, levelling agents, oils, light stabilizers, antioxidants, biocides, pigments, rheology modifiers, humectants, defoamers and mixtures thereof. Preferably, the embossing ink has a surface tension higher than the base material. Similarly to the base material, the surface tension of the embossing ink can be modulated both by selecting raw materials and by using additives, the same described above to modify the base material. In addition to modifying the surface tension to obtain more or less marked penetration effects, the addition of surface tension modifiers contributes to improve the printability of the embossing ink, especially when using inkjet printers. The control of the depth of the embossing ink in the base material can be modulated in different ways, such as for example by applying more or less embossing ink, and/or by applying more or less base material (leading to a thicker or thinner base layer), and/or by making more or less time passing between the application of the embossing ink and the subsequent polymerization of the base material and embossing ink, and/or by varying the speed of the droplet of the embossing ink by using the waveform, where the quicker droplets will be able—due to their higher impact—to penetrate deeper into the base material.

The panel according to the invention may preferably be provided with multiple textures, in particular a digitally created embossing structure and a mechanically created embossing structure. This provides substantially more freedom to design accurate embossing and/or debossing designs with a high level of detail, not only because a mechanically applied texture and a digitally applied texture can be combined in various ways, but also because an infinite number of texture design variations can be realized by (varying) the digitally applied texture. The plural texture provides a more pronounced (rough and hilly) embossing structure, wherein relatively deep embossings, such as, for example, an artificial knothole, grouts, grooves, brushstroke structures, plastering techniques such as rubbing plaster, spatula techniques, natural and organic structures, stones or artificial animal skin, like e.g. crocodile skin, may be created, which leads to a more realistic appearance of the panel as such. The digitally created first texture and/or the mechanically created second texture may also be used to create one or more bevels and/or one or more grouts, preferably located at one or more panel edges, but which may also artificially and visually divide the panel into two or more smaller panels (subpanels). For example, by means of a press mould, such as a press plate, bevels and/or grouts may be mechanically pressed into the core and/or the decorative top structure. Typically, the mechanically created embossing (defining the second texture) could be used to cost-efficiently create a basic embossing structure, in particular basis embossing pattern, which may be a relatively intense (i.e. deep) embossing structure. The digitally created embossing (defining the first texture) is typically used to improve the second texture to realize an overall texture which has a more realistic light effect as well as a better depth effect, and hence haptic effect, wherein the colours of the décor image are typically better perceptible. At least a part of the first texture and at least a part of the second texture may be in an offset position. Preferably at least a part of the first texture and at least a part of the second texture may be aligned (in register) with each other to realize a more amplified (intense) embossing, more preferably a more amplified (intense) embossing which is position-selectively applied, in particular in line with a decorative image of the decorative print layer. The digitally created first texture is at least partially realized by means of digital printing. In this respect, digital printing can be used to, either directly or indirectly, generate indentations (cavities or recesses, such as grooves) and/or elevations (protrusions). The mechanically created second texture is at least partially, and typically entirely, realized by providing the core and/or at least one layer of the decorative top structure with one or more impressions and/or one or more engraves. These impressions (or engraves) are grooves, cavities or recessed which are pressed into said layer by using a press mould, such as a press plate or press roll.

As already addressed above, the first texture is preferably at least partially defined by at least one, at least partially cured base layer being provided with a plurality of indentations. Like the mechanically applied impressions these indentations constitute cavities and/or recesses, such as groove, and the like, which could have an equivalent look and feel appearance. However, during the formation of the impressions panel material is typically merely deformed, which during the formation of the indentations panel material is typically removed from the panel, either chemically and/or mechanically. Different embodiments of these indentations are described in more detail below. Preferably, a part of the base layer is provided with said plurality of indentations, and wherein another part of the base layer is free of indentations. Hence, in this embodiment, the base layer is merely partially embossed. At least a part of the part of the base layer which is free of indentations may be used to create (build) elevations, preferably by means of digital printing.

It is imaginable that the plurality of indentations of the base layer forms a discontinuous and/or a continuous indentation pattern. It is also imaginable that the plurality of indentations of the base layers forms a regular indentation pattern. Typically, the indentation pattern to be realized is strongly, or even completely, dependent on at least one décor image of the decorative layer.

Preferably, the base layer is a printed base layer. This means that the base layer, initially in liquid state, is printed, either directly or indirectly on top of the decorative layer. Alternatively, the base layer may be applied, in an initially liquid (uncured) state, by means of a roller coater. One or more indentations may be provided in the base layer when the base layer is still in liquid state and/or one or more indentations may be provided in the base layer during and/or after—partially or fully—curing (solidifying) the base layer. Providing one or more indentations in the liquid base layer is preferably done by means of chemically embossing. To this end, preferably (small) reactive droplets of an embossing liquid are position-selectively digitally printed, or sprayed, onto the liquid base layer to cause a chemical reaction between the material of the printed droplets and the still liquid base layer, wherein the subsequent reaction product changes the structure at this location of the base layer optically and/or haptically. Alternatively, providing one or more indentations in the liquid base layer may be realized by means of a combination of digital printing and subsequent mechanical action to remove panel material position-selectively. To this end, droplets of an (alternative) embossing liquid may be deposited, preferably digitally printed, onto the still liquid (uncured) base layer, in a position-selective manner. This means that the embossing liquid is applied on portions of the base layer where indentations will have to be formed. After application of this embossing liquid, the base layer is preferably at least partially cured, e.g. by means of ultraviolet (UV) radiation. During this irradiation step, the base layer is typically polymerized, but wherein the portions of the base layer enriched with the embossing liquid will remain (sufficiently) liquid and/or soft to allow subsequent and/or simultaneous removal of these soft portions. This soft portion removal can be realized e.g. by means of mechanical action, such as by means of a rotating brush, but may also be realized by forcing the soft portions to evaporate, preferably by means of infrared (IR) beams and/or by means of hot air and/or by means of a suction device (vacuum device) and/or by any other extraction technique. Alternative material removal methods, like material removal by using a laser beam, an electron beam, or a water beam, are also conceivable in this respect. In this embodiment, it is preferred that the base layer is a hydrophobic base layer, which facilitates that water based embossing liquid droplets ejected by a digital printing device will stay as droplets at a predefined locations during the subsequent curing process step.

The base layer is preferably a curable resin, which is initially applied in liquid state. The resin can be cured by means of electromagnetic radiation, such as UV or IR radiation, and/or can be cured by electronic beam curing (EBC), wherein electrons are typically shot at high velocity on the base layer to harden (cure) the base layer. The base layer may, for example, be at least partially composed of melamine, polyurethane, epoxy resin and/or any (other) photocurable resin. The base layer may, for example, (also) at least partially composed of epoxy acrylates, urethane acrylates, polyester acrylates, polyether acrylates, amino acrylates, silicone acrylates, polyisoprene acrylates, polybutadiene acrylates and acrylate monomers, wherein the term acrylates includes both acrylate and methacrylate resins. Also vinyl monomers may be used to compose the base layer at least partially, wherein in this case preferably N-vinyl caprolactam (NVC), acryloyl morpholine (ACMO), diethylene glycol divinyl ether (DVE-2), triethylene glycol divinyl ether (DVE-3) and/or mixtures thereof, is/are used. The base layer may contain solid particles in an amount of at least 20% by weight with respect to the weight of the base layer.

In case an embossing liquid is used to realize the indentations in the base layer, the embossing liquid preferably comprises at least one constituent chosen from the group consisting of: water, a water based substance, silicone, silicone polyether, silicone acrylate, and silicone polyether acrylates. The presence of silicones typically improves the embossability of the base layer and provides a natural appearance to the treated coating, which may be particularly appreciated from an aesthetic point of view.

Providing one or more indentations in the base layer during or after curing may be done by either chemical embossing (as described above) and/or by mechanical embossing. In this respect, it is noted that the base layer may (additionally or alternatively) be subjected to a laser beam or particle beam, such as a water beam or electron beam to cure the base layer.

Preferably, the indentations provided in the base layer have a depth situated in between 2 micron and 100 micron, preferably situated in between 3 micron and 50 micron. Preferably, the elevations of the elevated pattern layer have a height situated in between 2 micron and 500 micron, preferably situated in between 3 micron and 300 micron. The total embossing depth is determined by the sum of the greatest indentation depth and the greatest elevation height. In case a plurality of base layers and/or a plurality of elevated pattern layers is applied, an increase of the total embossing depth can be achieved. Typically, the elevated pattern layer is realized by means of digital printing, in particular 3D digital printing. Preferably, a digital printing device is used to apply at least one layer of the panel according to the invention, which comprises one or more digitally controllable orifices, each of which is/are configured to eject droplets of a hardenable liquid to generate the elevated pattern layer and/or another panel layer, such as an (even or uneven (textured)) intermediate layer or a top coating. The layer thickness typically corresponds to the ejected liquid on the surface. In a preferred embodiment, the hardenable droplets being ejected such that at least two layer portions are formed by different hardenable liquids, wherein said layer portions are typically located side by side and adjacent to and/or at a distance from each other. More preferably, one of the liquids hardens to a layer being impervious to light, another of the liquids hardens to a layer being transmissive to light. This provides opaque and transparent portions in the elevated pattern layer, which provides more freedom of design of the decorative top structure, and hence of the panel as such. This, for example, makes it possible that a transparent layer portion at least partially borders an opaque layer portion. The two different hardenable liquids used in this process step could be either miscible or unmiscible with each other.

In a preferred embodiment, at least a part of the indentations of the base layer is aligned in register with at least a part of at least one decor image formed by the decorative print layer.

In a preferred embodiment, at least a part of the indentations of the base layer is aligned in register with at least a part of at least one decor image formed by the decorative print layer, in particular at least one pattern defined by at least one décor image formed by the decorative print layer. Preferably, at least a part of the elevations of the elevated pattern layer is aligned in register with at least a part of at least one decor image formed by the decorative print layer. By applying an alignment in register, also referred to as embossing in register, a very realistic and/or artistic design and appearance of the panel can be realized. The décor image may be formed by a wood pattern. However, it is well thinkable that the décor image represents another kind of pattern, such as, for example, a customized picture and/or a mosaic pattern or tile pattern. In case of a mosaic pattern or tile pattern, artificial tiles may be depicted which are aesthetically separated by one or more grouts. Here, the embossing structure applied may comprise a base layer having thicker layer parts covering the artificial tiles and thinner layer parts covering one or more grouts. Here, it is also imaginable that elevations of the elevated pattern are predominantly or merely covering the artificial tiles and less or not at all the artificial tiles. In this manner, a realistic surface relief can be realized which is practically equal to the surface relief obtained when using real tiles and grouts.

In a preferred embodiment, the first texture is at least partially defined by at least one at least partially cured elevated pattern layer formed by a plurality of printed elevations. In this respect, the elevated pattern layer is preferably realized by means of printing, in particular digital printing, and defines a (printed) positive embossing layer. The elevations (protrusions) are preferably provided on top of said negative embossing layer formed by the indentations (recesses) applied in the aforementioned base layer. This means that said elevated pattern layer is preferably printed on top of said base layer. Typically, an upper side of the base layer defines an embossing base level, and wherein the indentations and at least a part and/or at least a number of the elevations are situated at opposite sides of said embossing base level. It is also imaginable that the indentations and at least a part and/or at least a number of the elevations are situated at the same side of said base level.

As already indicated above, the elevations, of at least a part thereof and/or a number thereof, are preferably printed on the part of the base layer which is free of indentations, which leads to an increased depth effect of the embossing structure as such.

Typically, an upper side of the base layer defines an embossing base level, and wherein the indentations and at least a part and/or at least a number of the elevations are situated at opposite sides of said embossing base level. It is also imaginable that the indentations and at least a part and/or at least a number of the elevations are situated at the same side of said base level.

Preferably, the elevations of the elevated pattern layer have a height situated in between 2 micron and 500 micron, preferably situated in between 3 micron and 300 micron. Preferably at least one impression of the second texture has a depth of at least one 0.4 micrometre. The total embossing depth is determined by the sum of the greatest indentation and/or impression depth and the greatest elevation height. In case a plurality of base layers and/or a plurality of elevated pattern layers is applied to define the first texture, the total embossing depth of the first texture and the texture can be enlarged significantly, leading to more realistically experienced artificial visual and haptic effects. Here, the total embossing depth, as measure from a top surface of the panel, may be more than 700 micron, even more than 800 micron, and even more than 900 micron. In case the second texture is at least partially applied in an upper side of the core, the total embossing depth can be enlarged even further, depending on the core thickness.

Preferably, at least a part of the elevations of the elevated pattern layer is aligned in register with at least a part of at least one decor image formed by the decorative print layer, in particular at least one pattern defined by at least one décor image formed by the decorative print layer. To this end it is conceivable that at least one 3D camera is used to determine (analyse) a relief pattern of a physical sample piece. After determining the pattern specialized software can be utilized to translate the image to a three-dimensional model of the sample piece. A 3D printer can be configured to print the indentations and/or elevations in register with the three-dimensional model. As such, an indentation pattern and/or elevated pattern layer could be obtained substantially without the need for manually setting or determining locations for the indentations and/or elevations. A sample piece could for example be a piece of natural wood, a natural stone or the like, such that the 3D camera could provide the most naturally looking surfaces.

The impressions are preferably obtained by means of at least one pressing mould, such as a pressing plate and/or an embossing roll. Typically this pressing mould is provided with an inverse impression of the selected second texture. During realizing the second texture, the pressing mould will be pressed against a panel surface to be textured, wherein typically also heat is applied. This latter can be realized, for example, by using a heated pressing mould. Here, it is for example imaginable that the pressing mould is pressed with a pressure of 25-bar onto the (unfinished) panel. The temperature applied may vary, but is typically situated between 150 and 200 degrees Celsius. The pressing mould is typically pressed onto the (unfinished) panel for a period of time of 0.5-50 seconds. Alternatively or additionally, the second texture can be applied by any other type of mechanical action, such as brushing, drilling, milling, engraving and/or scratching, although this other type of mechanical action typically leads to a more randomly shaped second texture rather than a predefined second texture which is obtained by using a pressing mould. It is imaginable that not only the core is provided with the second texture, but that also one or more layers of the decorative top structure is/are provided with said second texture. This second texture may be realized in a single pressing step. In this case, it is not unlikely that the decorative print layer is (slightly) deformed as well. Since the deformation of the decorative print layer is predefined and known in advance, it is imaginable that the initially printed image of the decorative print layer is adjusted in advance such to compensate the deformation of the print layer during impression. This will result in an image which does not look to be deformed at all.

Preferably, at least a part of the impressions of the second texture is aligned in register with at least a part of at least one decor image formed by the decorative print layer, in particular at least one pattern defined by at least one décor image formed by the decorative print layer. The one or more impressions may consist of successive short impressions, and/or of longer, uninterrupted, possibly bent impressions. Other designs are obviously not excluded. In case the image of the decorative print layer represents a wood (nerves) pattern, it is often desired that the location and/or shape of the impressions is in function of at least a part of the wood pattern, with which it is meant in the first place that these impressions are realized in function of the wood nerves and possibly additionally in function of the wood pores. In the case of short impressions, these can be directed with their length according to the printed wood nerve and/or can be directed with their longitudinal direction, and preferably also follow the wood nerves.

In an alternative embodiment of the panel according to the invention, at least one second texture is created by means of an applicator roll, wherein a material layer is initially applied to the applicator roll and subsequently be transferred onto a surface of the (unfinished) panel, wherein said material layer is textured by means of the applicator roll and/or by means of a plurality of digitally controlled gas nozzles which are configured to blow gas, in particular air, onto the material layer born by the applicator roll in order to transform (texture) said material layer prior to transferring the material layer onto a surface of the (unfinished) panel. Dependent on the gas nozzle control, this may lead to a material layer having a random second texture or having a predefined second texture.

Preferably, at least one impression has a depth which exceeds the nominal thickness of the decorative top structure. This implies that the core that said at least one impression causes a core deformation. As indicated above, it is imaginable that the at least one impression is provided in the core only, and that the super-positioned decorative top structure is following the second texture realized in this manner.

It is imaginable and often efficient that the maximum depth of the second texture exceeds the maximum depth of the first texture, with respect to a top surface of the panel. It is however also imaginable that the maximum depth of the first texture exceeds the maximum depth of the second texture, with respect to a top surface of the panel.

In a preferred embodiment, at least one cover layer, preferably at least one wear layer, of the decorative top structure comprises the first texture. This first texture typically leaves the decorative print layer intact (unaffected/undeformed). It is imaginable that at least one cover layer, preferably at least one wear layer, of the decorative top structure comprises the second texture. The second texture may be such that the second texture deforms the decorative print layer. However, the second texture may also be such that the second texture does not deform the decorative print layer, and leaves the decorative print layer intact.

Preferably, at least one first cover layer, more preferably at least one first wear layer, of the decorative top structure comprises the first texture, and wherein at least one second cover layer, preferably at least one second wear layer, of the decorative top structure the second texture. It is imaginable that the second texture is also at least partially present in the first cover layer. And vice versa, it is imaginable that the second texture is also at least partially present in the first cover layer, although this is typically less likely due to the different application method of the first texture.

In a preferred embodiment, the decorative top structure comprises at least one wear layer and at least one top coating, preferably a UV hardened top coating, covering said wear layer(s). Typically, this top coating defines an upper surface of the panel. The top coating is often a lacquer layer which is at least partially hardened (cured) by means of (UV) irradiation. In this respect, it is often preferred to firstly harden (cure) the first texture at least partially, before hardening (curing) the top coating, in particular the lacquer layer. The lacquer layer can comprise any suitable known abrasion-resistant material, such as an abrasion-resistant macromolecular material coated onto the layer beneath it, or a known ceramic bead coating. If the top coating is furnished in liquid form, it can be bonded to the layer beneath it by curing the top coating. The top coating can also comprise an organic polymer layer and/or inorganic material layer, such as an ultraviolet hardened or hardenable coating or a combination of another organic polymer layer and an ultraviolet hardened or hardenable coating. The top coating may be provided with at least one antimicrobial substance to increase the antimicrobial resistance of the panel as such. In an embodiment of a panel according to the invention, at least a part of the (first and/or second) texture of the panel is left uncovered by the top coating. In this manner, a further embossing effect (relief effect) can be achieved, and/or in this way glossy and matt areas may be created in this manner, which may further contribute to a desired aesthetical appearance of the panel as such. In this respect, it is for example imaginable that the décor image of the decorative print layer is formed by artificial tiles separated by grouts, the artificial tiles may be covered by the lacquer layer to provide these tiles a glossy effect, while the grouts are left substantially uncovered by the lacquer layer to maintain a more matt appearance.

Preferably, at least a part of the decorative layer is positioned below the first texture and the second texture. It is imaginable that the decorative print layer is at least partially deformed by the second texture, but it is also imaginable that the decorative print layer is not deformed by the second texture and stays intact. In case the decorative print layer is foreseeable deformed by the second texture, it is preferred to print the image in a slightly modified format during printing to compensate a subsequent deformation during application of the second texture. However, it is also imaginable that it is preferred from an aesthetical point of view to purposively create a deformed decorative print layer, for example by printing said decorative print layer onto a textured surface and/or by deforming the decorative print layer after application thereof. This could lead to an improved visual depth effect.

It is imaginable that at least a part of the decorative print layer is positioned in between the first texture and the second texture. In this case, it is imaginable that the decorative print layer is positioned on top of the first texture, and that the second texture is positioned on top of the decorative print layer. It is also imaginable that the decorative print layer is positioned on top of the second texture, and that the first texture is positioned on top of the decorative print layer.

It is imaginable that at least one first texture is positioned below at least one second texture, and/or that at least one first texture is positioned above at least one second texture. Various configurations are conceivable in this respect.

Preferably, the panel comprises a top surface, wherein the first texture and/or the second texture define at least partially the relief (texture) of said top surface. Here it is imaginable that at least one texture present within the panel is substantially no longer or barely present at the top surface, typically because the applied texture is undone by at least one super-positioned layer. This latter may be advantageous to create a visible textured decorative print layer, e.g. to create improved depth effects, wherein said textured is no longer desired, or at least not at the full initial roughness level, at the top surface of the panel as such.

In a preferred embodiment, the top surface of the panel according to the present invention has an average roughness (Ra) larger than 15 μm, preferably larger than 17 μm and most preferably larger than 20 μm. The average roughness Ra, also called surface roughness, is preferably smaller than 500 μm, more preferably smaller than 400 μm and most preferably smaller than 350 μm, in particular smaller than 300 μm. The maximum roughness (Rm) can obviously be larger than the aforementioned values, and may exceed 500 μm, which is for example desirable in specific designs, such as in designs having one or more artificial (wooden) knotholes. The average roughness (Ra) is the arithmetic average of the absolute values of the roughness profile ordinates (vertical coordinates with respect to a roughness mean line). Also known as Arithmetic Average (AA), Center Line Average (CLA). The average roughness is the area between the roughness profile (defining the texture) and its mean line, or the integral of the absolute value of the roughness profile height over the evaluation length It is imaginable and could be preferable that at least one visible panel layer, such as a top coating, or any other layer of the decorative top structure has a changing degree of gloss in at least one direction extending parallel a plane defined by the panel. In this way, glossy and matt areas could be created which could be beneficial from an aesthetic point of view. This changing degree of gloss could at least partially be aligned with and/or adjusted to the décor image of the decorative print layer. Preferably, during production the initially hardenable top coating is irradiated with shortwave UV light and/or an electron beam, typically having a wavelength smaller than 200 micron, to harden (cure or polymerise) the top coating, such that micro-creasing occurs, which leads to an extremely matt optical structure. Preferably, at least one UV irradiation step is performed under inert conditions. This latter is preferably realized by applying an atmosphere consisting of one or more of the following gases: helium, neon, xenon, krypton, nitrogen, and/or carbon dioxide. Depending on the composition of the substance to be cured, UV curing of a substance may cause oxygen inhibition. The oxygen inhibition effect typically occurs in free radical UV systems. Oxygen inhibition means that oxygen, a very reactive gas, also reacts very quickly with free radicals formed from acrylate double bond systems after the reaction between oxygen and these free radicals stops the polymerisation process at the surface of the coating or printing ink. In consequence the coating or printing ink will remain tacky on the surface, while deeper layers have cured properly. Properties like scratch resistance and chemical resistance will be dramatically reduced by this undesired effect, which can be prevented by applying said inert atmosphere.

The height of the micro-creasing is typically of the order magnitude of 100 nm. More preferably, the top coating is additionally depth-structured, forming structuring depressions to provide the top coating with an additional texture, which might be the second texture. It is imaginable that the top coating has or is provided with at least one glossy lacquer layer.

It is imaginable that the panel comprises a plurality of decorative print layers. It is imaginable, and typically preferable, that at least one decorative print layer is a continuous (uninterrupted) layer. It could also be preferred that at least one decorative print layer is a discontinuous (interrupted) layer covering only a portion of a layer positioned underneath.

Preferably, the decorative top structure comprises a decorative visual print layer, at least one substantially transparent or translucent wear layer applied on top of said print layer, and, preferably, at least one substantially transparent or translucent top coating layer applied on top of said at least one wear layer, wherein at least one wear layer and/or at least one top coating layer comprises graphene and/or at least one derivative of graphene. The visual print layer may be composed solely of a decorative ink layer, but is also imaginable that the visual print layer comprises a substrate layer, such as a polymer film or paper film, onto which a decorative ink layer is printed or otherwise applied. Said visual print layer may be attached directly to the core, e.g. by fusing the visual print layer onto the core or by gluing the visual print layer to the core, wherein use can be made e.g. of a polyurethane adhesive. Optionally, an upper surface of the core is covered by at least one primer layer before attaching the visual print layer to the core, wherein the visual print layer will actually be attached to the (upper) primer layer applied to the core. This preferred embodiment implies that (at least a part of) the graphene (derivative(s)) is applied on top of said decorative print layer, and hence is able to contribute to the protection of said decorative print layer. As mentioned above, the decorative top structure can be partially or entirely by realized by digital printing. Optionally, the substance, in particular the ink, to realize at least a part of the wear layer and/or top coating can be enriched (mixed) with particles of graphene and/or graphene derivate(s). It is imaginable that the decorative top structure comprises a decorative visual print layer and a single—only one— transparent or translucent wear layer on top of said visual print layer without applying a separate top coating layer. At least one wear layer, and preferably each wear layer in case a plurality of wear would be applied, is preferably made of transparent or translucent polyurethane or, alternatively, polyvinylchloride, polypropylene, or any another suitable transparent or translucent polymer, or alternatively of a translucent, in particular transparent, glaze.

Preferably, the decorative top structure comprises at least one composite layer, which composite layer comprises a graphene and/or graphene derivative content between 0.01% and 1.5% by weight, preferably between 0.5% and 1.0% by weight of the composite layer. This amount of graphene and/or graphene derivate is often sufficient to significantly increase the hardness and the impact resistance of the panel, while keeping the cost price increase as limited as possible and/or while keeping the top structure sufficiently transparent and/or translucent to secure sufficient visibility of the decorative print layer of the top structure.

The decorative top structure may comprise at least one layer composed of graphene paper. Graphene paper is typically composed of graphene and/or one or more of its derivatives, such as graphene oxide(s). Graphene paper is preferably at least partially composed of a graphene nanosheets assembled in a layer-by-layer manner. Because of the finite size of the graphene sheets, the in-plane tensile load can hardly be continuously transferred through intralayer bonds of the distributed graphene sheets, thus the interlayer crosslink is preferred to assist the tensile load transfer between adjacent layers. For graphene nanocomposites the intralayer covalent bonds are usually much stronger than interlayer crosslinks. Typically, for graphene paper, the used starting material is water-dispersed graphene oxide flakes, which is vacuum filtrated to produce free standing foils. The thickness of these foils is typically in the range of 0.1-150 µm, preferably 5-120 µm. Like graphene, graphene paper is an electrical conductor, and like graphene oxide, graphene oxide paper is an electrical insulator. By graphene—graphene oxide paper, the paper is partially composed of graphene, and partially composed of graphene oxide, optionally reduced graphene oxide. By adjusting the ratio between graphene and graphene oxide, the electrical conductivity of the paper can be tuned. This may be used to optimize the conductive properties for the aimed application of the decorative panel according to the invention. It is imaginable that the decorative top structure comprises at least one decorative print layer which is positioned above said graphene (oxide) comprising paper, and wherein said graphene (oxide) comprising paper preferably bears said decorative print layer.

Preferably, the Young's modulus of the decorative top structure is between 9-181 Gpa, preferably between 9 and 50 Gpa, more in particular approximately 10 Gpa. The actual Young's modulus strongly depends on the amount of graphene and/or graphene oxide used, as well as on in which form said graphene and/or graphene is applied. Typically, graphene sheets as such may have a Young's modulus of 1,000 Gpa. When graphene is used a part of a composite material in a layer of the top structure, which is often the case, the Young's modulus will typically drop below 181 Gpa, and will mostly be around 10 Gpa.

Preferably, at least one substantially transparent or translucent layer of the decorative top structure is a printed layer. This layer may or may not comprise graphene and/or graphene derivative(s). It is imaginable that the entire top structure is applied by means of digital printing. It is also imaginable that a part of the top structure, including at least one decorative layer, and at least one wear layer, is applied by means of digital printing.

Preferably, the application level of the antimicrobial composition on a panel surface is preferably in a range of 0.5 $g/m^2$ to 5.0 $g/m^2$, more preferably in a range of 1.0 $g/m^2$ to 3.0 $g/m^2$.

It is imaginable that a footprint of the core exceeds a footprint of the decorative top structure. It is imaginable that a part of the upper side of the core, preferably along one or more edges, extends with respect to the decorative top structure. This exposed part of the upper side of the core may be used to facilitate coupling of panels and/or to form a grout line, optionally to be filled with grout after installation (interlocking) of the panels. The decorative top structure may also be a multi-layered structure. Preferably, the decorative top structure comprises at least one decorative layer and at least one transparent wear layer covering said decorative layer. Preferably, the decorative top structure comprises from bottom to top:

i. Optionally, at least one base layer, in particular a primer and/or adhesive layer, ii. At least one décor layer, in particular a thermoplastic or paper film provided with a decorative (digital or mechanically applied) print, iii. At least one transparent wear layer covering said decorative layer, and iv. Optionally, at least one lacquer layer, preferably UV cured lacquer layer, covering said wear layer.

Said lacquer layer or other protective layer may be applied on top of said wear layer to protect the top structure and hence the panel as such. A finishing layer may be applied in between the decorative layer and the wear layer. The decorative layer will be visible and will be used to provide the panel an attractive appearance. To this end, the decorative layer may have a design pattern, which can, for example be a wood grain design, a mineral grain design that resembles marble, granite or any other natural stone grain, an image, a photo, or a colour pattern, colour blend or single colour to name just a few design possibilities. Customized appearances, often realized by digital printing during the panel production process, are also imaginable. In an alternative embodiment, the decorative top structure is omitted, thus not applied, in the panel according to the invention. In this latter embodiment, the decorative panel, in particular a floor panel, ceiling panel or wall panel, comprising: a core provided with an upper side and a lower side, a first panel edge comprising a first coupling profile, and a second panel edge comprising a second coupling profile being designed to engage interlockingly with said first coupling profile of an adjacent panel, both in horizontal direction and in vertical direction, wherein said core comprises at least one wool layer at least partially formed by man-made vitreous fibres bonded together by at least one cured thermoset polymeric binder material.

Preferably, the first coupling profile comprises:

an upward tongue, at least one upward flank lying at a distance from the upward tongue, an upward groove formed in between the upward tongue and the upward flank wherein the upward groove is adapted to receive at least a part of a downward tongue of a second coupling profile of an adjacent panel, and at least one first locking element, preferably provided at a distant side of the upward tongue facing away from the upward flank, and preferably the (complimentary) second coupling profile comprises:

a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces. In this latter embodiment, the at least one locking element of the first locking element and second locking element may be formed by a (flat of otherwise shaped) contact surface composed of a, optionally separate, plastic material configured to generate friction with the other locking element of another panel in engaged (coupled) condition. Examples of plastics suitable to generate friction include:

Acetal (POM), being rigid and strong with good creep resistance. It has a low coefficient of friction, remains stable at high temperatures, and offers good resistance to hot water;

Nylon (PA), which absorbs more moisture than most polymers, wherein the impact strength and general energy absorbing qualities actually improve as it absorbs moisture. Nylons also have a low coefficient of friction, good electrical properties, and good chemical resistance;

Polyphthalamide (PPA). This high performance nylon has through improved temperature resistance and lower moisture absorption. It also has good chemical resistance;

Polyetheretherketone (PEEK), being a high temperature thermoplastic with good chemical and flame resistance combined with high strength. PEEK is a favourite in the aerospace industry;

Polyphenylene sulphide (PPS), offering a balance of properties including chemical and high-temperature resistance, flame retardance, flowability, dimensional stability, and good electrical properties;

Polybutylene terephthalate (PBT), which is dimensionally stable and has high heat and chemical resistance with good electrical properties;

Thermoplastic polyimide (TPI) being inherently flame retardant with good physical, chemical, and wear-resistance properties.

Polycarbonate (PC), having good impact strength, high heat resistance, and good dimensional stability. PC also has good electrical properties and is stable in water and mineral or organic acids; and Polyetherimide (PEI), maintaining strength and rigidity at elevated temperatures. It also has good long-term heat resistance, dimensional stability, inherent flame retardance, and resistance to hydrocarbons, alcohols, and halogenated solvents.

It is imaginable that the first coupling profile and the second coupling profile are configured such that in coupled condition a pretension is existing, which forces coupled panels at the respective edges towards each other, wherein this preferably is performed by applying overlapping contours of the first coupling profile and the second coupling profile, in particular overlapping contours of downward tongue and the upward groove and/or overlapping contours of the upward tongue and the downward groove, and wherein the first coupling profile and the second coupling profile are configured such that the two of such panels can be coupled to each other by means of a fold-down movement and/or a vertical movement, such that, in coupled condition, wherein, in coupled condition, at least a part of the downward tongue of the second coupling part is inserted in the upward groove of the first coupling part, such that the downward tongue is clamped by the first coupling part and/or the upward tongue is clamped by the second coupling part.

In a preferred embodiment, the panel comprises at least one third coupling profile and at least one fourth coupling profile located respectively at a third panel edge and a fourth panel edge, wherein the third coupling profile comprises:

a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

The panel, typically the core, in particular at least one core, preferably comprises recycled material. Recycled material typically relates to reusing left-over material resulting from prior (panel) production processes.

The core preferably has a thickness of at least 3 mm, preferably at least 4 mm, and still more preferably at least 5 mm. The panel thickness is typically situated in between 3 and 12 mm, preferably in between 4 and 10 mm.

In a preferred embodiment, at least one wool layer has a varying density in the thickness direction of said wool layer. Preferably, the ratio mineral fibres and binder material varies in the thickness direction. In this manner, the more dense or less dense sublayer may be formed at the top side and/or bottom side of the wool layer, dependent on the desired properties of the panel. It is imaginable that at least one wool layer has a varying density in a width direction and/or a length direction of said wool layer. This may, for example, lead to a more dense wool layer zone at two or more panel's edges, which could be favourable for the formation of coupling profiles at these edges.

It is imaginable that at least one wool layer is at least partially filled with at least one filler, in particular an inert filler. This filler may for example be a colourant, chalk, talc, an antimicrobial substance, a fluorescent dye, etcetera.

In a preferred embodiment, the panel comprises at least one backing layer, which is affixed, either directly or indirectly, to a lower side of the core. At least one backing layer is preferably at least partially made of a flexible material, preferably at least one material chosen from the group consisting of: an elastomer, a thermoplastic material, ethylene-vinyl acetate, polyurethane, cork, wood, paper, and cardboard. The thickness of the backing layer typically varies from about 0.1 to 2.5 mm. The backing layer commonly provides additional robustness, dimensional stability, and an improved impact resistance of the panel as such, which increases the durability of the panel and prevent damaging of the panel.

Moreover, the (flexible) backing layer may increase the acoustic (sound-dampening) properties of the panel.

The invention also relates to a core for use in a decorative panel according to one of the previous claims, wherein a first core edge comprises at least a part of the first coupling profile, and wherein a second core edge comprises at least a part of the second coupling profile being designed to engage interlockingly, both in horizontal direction and in vertical direction, with said first coupling profile of an adjacent panel or adjacent core, wherein said core comprises at least one wool layer at least partially formed by man-made vitreous fibres bonded together by at least one cured thermoset polymeric binder material.

The invention further relates to a decorative covering, in particular a decorative floor covering, decorative ceiling covering, or decorative wall covering, comprising a plurality of mutually coupled decorative panels according to the invention.

Preferred embodiments of the invention as set out in the non-limitative set of clauses presented below.

1. Decorative panel, in particular a floor panel, ceiling panel or wall panel, comprising:
a core provided with an upper side and a lower side,
a decorative top structure affixed, either directly or indirectly, on said upper side of the core,
a first panel edge comprising a first coupling profile, and a second panel edge comprising a second coupling profile being designed to engage interlockingly with said first coupling profile of an adjacent panel, both in horizontal direction and in vertical direction,
wherein said core comprises at least one wool layer at least partially formed by man-made vitreous fibres bonded together by at least one cured thermoset polymeric binder material.

2. Decorative panel according to clause 1, wherein at least a fraction of the man-made vitreous fibres are made of at least one material selected from the group consisting of: stone wool, mineral wool, slag wool, basalt wool, and glass fibres.

3. Decorative panel according to clause 1 or 2, wherein at least one binder material is a material selected from the group consisting of: a urea-modified phenol formaldehyde resin, and an alkanolamine/carboxylic acid anhydride reaction product.

4. Decorative panel according to one of the previous clauses, wherein at least one binder material is a material selected from the group consisting of: acrylic resin, and an epoxy resin.

5. Decorative panel according to one of the previous clauses, wherein at least one binder material is formed by a sugar component, preferably selected from the group consisting of: sucrose, reducing sugars in particular dextrose, polycarbohydrates, and mixtures thereof.

6. Decorative panel according to one of the previous clauses, wherein the core comprises at least one main binder material is a material selected from the group consisting of: a urea-modified phenol formaldehyde resin, and an alkanolamine/carboxylic acid anhydride, and wherein the core comprises at least one co-binder material selected from the group consisting of: an acrylic resin and an epoxy resin.

7. Decorative panel according to clause 6, wherein the amount of co-binder, based on solids, is 1 to 50 weight percent of the total binder, preferably 5 to 35 weight percent of the total binder.

8. Decorative panel according to one of the previous clauses, wherein the core comprises a mixture of binder materials, wherein a first binder material has a higher curing temperature and/or curing rate than at least one second binder material.

9. Decorative panel according to any of the previous clauses, wherein the core comprises at least one fluorescent compound, preferably chosen from the group consisting of: xanthenes, acridines, quinine, quinine derivatives, coumarins, aryl sulfonates.

10. Decorative panel according to one of the previous clauses, wherein the core comprises aerogel particles.

11. Decorative panel according to clause 10, wherein weight of aerogel particles in the core exceeds the weight of the binder material and/or the weight of the man-made vitreous fibres in the core.

12. Decorative panel according to one of the previous clauses, wherein the fibre orientation in at least one wool layer of the core is substantially vertical.

13. Decorative panel according to one of the previous clauses, wherein the core comprises at least one base wool layer comprising a first mineral wool, and at least one top wool layer, positioned on top of said base wool layer, comprising a second mineral wool, wherein the first wool and the second wool have different material compositions and/or different structural properties.

14. Decorative panel according to one of the previous clauses, wherein the panel, in particular the core, comprises at least one reinforcement layer, preferably a non-woven layer or woven layer, in particular a cloth.

15. Decorative panel according to clause 14, wherein the reinforcement layer comprises fiberglass.

16. Decorative panel according to one of the previous clauses 14-15, wherein the reinforcement layer comprises natural fibres, such as jute, and/or synthetic fibres, in particular polymer fibres.

17. Decorative panel according to one of the previous clauses 14-16, wherein the at least one reinforcement layer is embedded in the core and preferably enclosed by two wool layers.

18. Decorative panel according to one of the previous clauses, wherein the panel comprises a plurality of reinforcement layers, wherein, preferably, at least one first reinforcement layer is located in a top portion of the core, and wherein at least one second reinforcement layer is located in a bottom portion of the core.

19. Decorative panel according to one of the previous clauses, wherein at least one core has a density lower than 1 kg/m3.

20. Decorative panel according to one of the previous clauses, wherein the decorative top structure is adhered onto the core by means of a waterproof adhesive.

21. Decorative panel according to one of the previous clauses, wherein the decorative top structure is fused onto the core, preferably without using a separate adhesive.

22. Decorative panel according to one of the previous clauses, wherein a lower side of the decorative top structure penetrates into an upper side of the core, preferably over a depth greater than 0.1 millimetre.

23. Decorative panel according to one of the previous clauses, wherein the decorative top structure comprises at least one decorative layer, preferably a digitally printed decorative layer, and at least one transparent wear layer covering said decorative layer.

24. Decorative panel according one of the previous clauses, wherein the decorative top structure comprises from bottom to top:
i. Optionally, at least one base layer, in particular a primer layer,
ii. At least one décor layer, in particular a digitally printed decorative layer and/or thermoplastic or paper film provided with a decorative (digital) print,
iii. At least one transparent wear layer covering said decorative layer, and
iv. Optionally, at least one lacquer layer, preferably UV cured lacquer layer, covering said wear layer.

25. Decorative panel according to one of the previous clauses, wherein the first coupling profile comprises:
an upward tongue,
at least one upward flank lying at a distance from the upward tongue,
an upward groove formed in between the upward tongue and the upward flank wherein the upward groove is adapted to receive at least a part of a downward tongue of a second coupling profile of an adjacent panel, and
at least one first locking element, preferably provided at a distant side of the upward tongue facing away from the upward flank, and wherein the second coupling profile comprises:

a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element preferably being provided at the downward flank.

26. Decorative panel according to any of the previous clauses, wherein the panel comprises at least one third coupling profile and at least one fourth coupling profile located respectively at a third panel edge and a fourth panel edge, wherein the third coupling profile comprises:

a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

27. Decorative panel according to any of the previous clauses, wherein at least a part of at least one coupling profile, preferably each coupling profile, is integrally made from material of the core.

28. Decorative panel according to any of the previous clauses, wherein at least one wool layer has a varying density in the thickness direction of said wool layer.

29. Decorative panel according to any of the previous clauses, wherein at least one wool layer has a varying density in a width direction and/or a length direction of said wool layer.

30. Decorative panel according to one of the previous clauses, wherein at least one wool layer is at least partially filled with an inert filler.

31. Decorative panel according to one of the previous clauses, wherein the panel thickness is situated in between 2 and 10 mm, preferably in between 3 and 10 mm.

32. Panel according to one of the previous clauses, wherein at least one panel layer comprises and/or is coated with at least one antimicrobial composition.

33. Panel according to clause 32, wherein said antimicrobial composition comprises at least one metal or metal containing compound selected from the group consisting of $Cu_2O$, $Cu(OH)_2$, $Cu$, $CuO_3$, $Cu_2O_3$, and a combination thereof, and at least one non-copper metal or non-copper containing metal compound.

34. Panel according to clause 32 or 33, wherein said antimicrobial composition is selected from (i) organic or organometallic antimicrobial substances such as halogenated phenyl ethers, halogenated salicylanilides, sesquiterpene alcohols, halogenated carbanilides, bisphenolic compounds, general phenols, formaldehyde, quaternary ammonium compounds, pyridine derivatives and hexachlorophene, and/or from (ii) inorganic antimicrobials substance including silver, zinc, or copper in glass or ceramic matrices, wherein the antimicrobial agent preferably comprises 2,4, 4'-trichloro-2'-hydroxydiphenyl ether.

35. Decorative panel according to one of the previous clauses, wherein the top structure comprises at least one glaze layer, in particular a decorative glaze layer.

36. Decorative panel according to clauses 35, wherein the top structure comprises at least one translucent, in particular transparent, glaze layer, wherein said wear layer is formed by said glaze layer.

37. Decorative panel according to one of the previous clauses, wherein the top structure comprises at least one layer at least partially composed of a material selected from the group consisting of: glaze, ceramic, stone, linoleum, ceramic, stone, concrete, mineral porcelain, glass, quartz, soapstone, mosaic, granite, limestone and marble.

38. Decorative panel according to one of the previous clauses, wherein the top structure comprises a textured upper surface.

39. Decorative panel according to one of the previous clauses, wherein the textured upper surface is a digitally printed textured surface, which comprises digitally printed indentations and/or digitally printed elevations.

40. Decorative panel according to clause 28 or 29, wherein at least a part of the textured surface of the decorative top structure is aligned in register with at least a part of at least one decor image of a decorative print layer of the decorative top structure, in particular at least one pattern defined by at least one décor image formed by a decorative print layer of the top structure.

41. Decorative panel according to one of the previous clauses, wherein the panel, preferably at least one panel edge, is provided with at least one bevel or grout.

42. Decorative panel according to clause 31, wherein at least one bevel or grout is a digitally printed bevel or grout.

43. Decorative panel according to clause 31 or 32, wherein at least one bevel or grout is a mechanically pressed bevel or grout.

44. Decorative panel according to one of clauses 31-33, wherein the panel is provided with at least one grout which artificially and visually divides the panel into a plurality of smaller panels 45. Core for use in a decorative panel according to one of the previous clauses, wherein a first core edge comprises at least a part of the first coupling profile, and wherein a second core edge comprises at least a part of the second coupling profile being designed to engage interlockingly, both in horizontal direction and in vertical direction, with said first coupling profile of an adjacent panel or adjacent core, wherein said core comprises at least one wool layer at least partially formed by man-made vitreous fibres bonded together by at least one cured thermoset polymeric binder material.

46. Decorative covering, in particular a decorative floor covering, decorative ceiling covering, or decorative wall covering, comprising a plurality of mutually coupled decorative panels according to any of clauses 1-44.

BRIEF DESCRIPTION OF THE DRAWINGS

The terms Fig., Figs., Figure, and Figures are used interchangeably in the specification to refer to the corresponding figures in the drawings.

The invention will be elucidated on the basis of non-limitative exemplary embodiments shown in the following figures, wherein.

DESCRIPTION OF THE INVENTION

Figure 1:
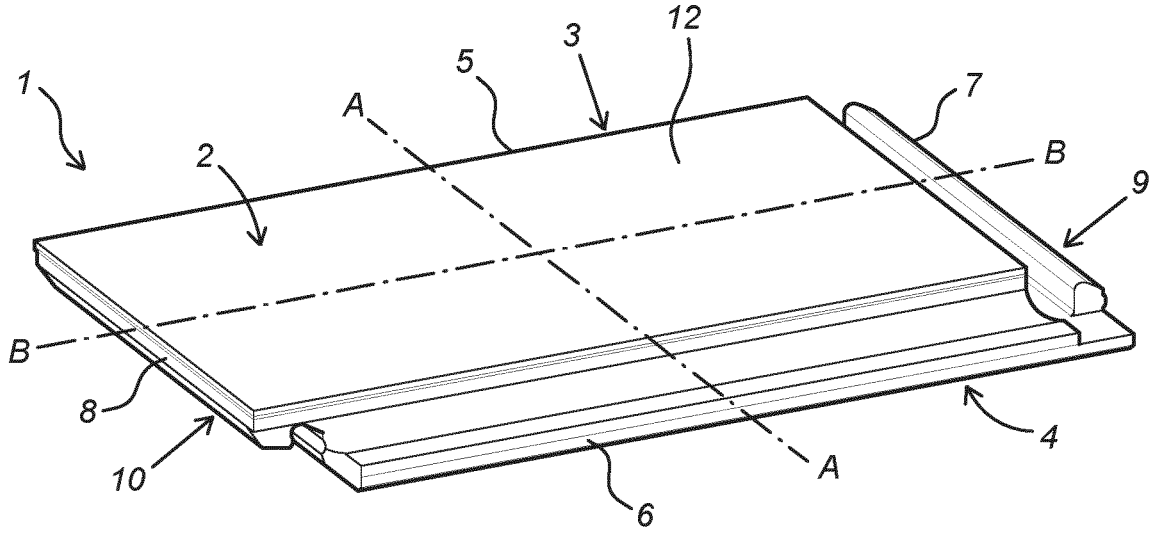
FIG. 1 shows a rectangular floor panel according to the present invention.
Figure 2:
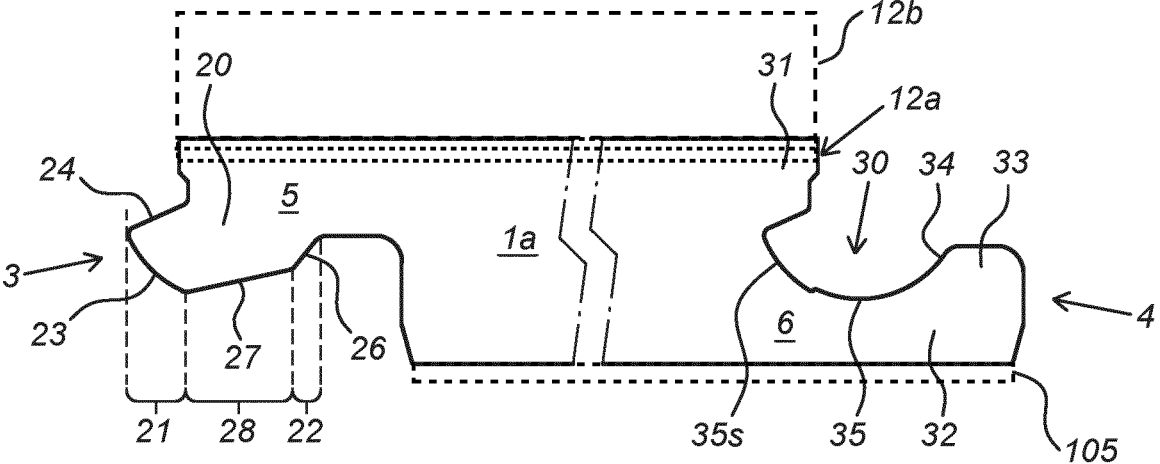
FIG. 2 shows a transversal cross-section along line A-A in FIG. 1, of respective side edges.

FIG. 1 shows a decorative panel 1 which upper side 2 is provided with a decorative top structure 12 (see also FIG. 2). The panel is of a rectangular shape having a length extending longitudinally along line B-B, and a width extending transversally along line A-A. The plane of the panel is hence determined by the combination of lines A-A and B-B. At opposite side edges 3 and 4, a first coupling part in the form of profile 5, resp. a second coupling part in the form of profile 6 is provided. At opposite side edges 9 and 10, a third coupling part in the form of profile 7 resp. a fourth coupling part in the form of profile 8 is provided.

FIG. 2 shows in transversal cross-section the first coupling part 5 at side edge 3. The first coupling part 5 comprises a sideward tongue 20 which comprises a front region 21 and a back region 22, wherein a bottom surface 23 and/or a side surface 23 of said front region 21 is rounded at least partly, wherein a top surface 24 of the front region 21 is at least partially inclined downwardly in a direction away from the back region 22, and wherein a bottom surface 26 and/or side surface 26 of the back region 22 of said sideward tongue 20 defines a first contact portion 26, and wherein the sideward tongue 20 comprises a passive bottom surface 27 situated adjacent to the first contact portion 26, wherein said passive bottom surface 27 is defined by a cut-out portion at a lower side of the sideward tongue 20. The passive bottom surface 27 herein extends over an intermediate region 28 between the back region 22 and the front region 21, and is substantially flat. The passive bottom surface 27 is inclined downwardly in a direction towards the front region 21, such that the inclined top surface 24 of the sideward tongue and the inclined passive bottom surface 27 converge in a direction away from the back region of the sideward tongue. Furthermore, the second coupling part 6 comprises a recess 30 for accommodating at least a part of the sideward tongue 20 of a further panel, said recess 30 being defined by an upper lip 31 and a lower lip 32, wherein the lower lip 32 extends beyond the upper lip 31, and wherein the lower lip 32 is provided with a upwardly protruding shoulder 33 defining a second contact portion 34 configured to actively co-act with a first contact portion 26 of another panel, in coupled condition of such panels as will be discussed with reference to FIG. 4. A top surface 35 of the lower lip 32 is smoothly curved at least partially and is configured as sliding surface for the at least partially rounded bottom surface 23 and/or side surface 23 of the front region 21 of the sideward tongue 20 of another panel during coupling of a first and second coupling part. The upper surface 35 of the lower lip is provided with a staggered cut-out portion 35s, which is at least partially located underneath the upper lip 31, and which is configured to accommodate a terminal portion of the sideward tongue 20 of another panel.

The panel 1 comprises a core 1a, and a decorative top structure 12 affixed, either directly or indirectly, on top of said core. An optional backing layer 105 is attached to a lower side of the core 1a. The core 1a comprises at least one (mineral) wool layer at least partially, and optionally entirely, formed by man-made vitreous fibres bonded together by at least one cured thermoset polymeric binder material, typically a resin. Preferably, at least a fraction of the man-made vitreous fibres are made of at least one material selected from the group consisting of: stone wool, mineral wool, slag wool, basalt wool, and glass fibres. It is imaginable that the core 1a comprises a plurality of different wool layers and/or at least one non-wool layer, such as for example a glass fibre layer, a thermoplastic layer, and/or a cementitious layer. The top structure 12 can be of various nature, wherein two embodiments 12a, 12b are shown in FIG. 2. In a first embodiment 12a, the top structure has a laminated structure, and comprises a decorative layer, in particular a thermoplastic or paper film carrying a, preferably digitally printed, decorative image, and at least one protective layer, such as a finishing layer, and/or a wear layer, and/or a lacquer, positioned on top of said decorative layer. Further embodiments have been described in the above description. Alternatively, or additionally, the top structure 12b may comprises a tile, in particular a mineral tile, preferably at least partially made of ceramic and/or stone, and/or any material chosen from the group consisting of: ceramic, stone, concrete, mineral porcelain, glass, quartz, soapstone, mosaic, granite, limestone and marble. Typically, these tiles are hard—even impossible—to profile, as a result of which the profile core offers a solution to manufacture interlockable mineral tiles. The top structure 12 may be glued, by means of an adhesive, and/or fused onto the core 1a.

The backing layer 105 is attached, directly or indirectly, to a rear side of the core 1a. The at least one backing layer is preferably at least partially made of a flexible material, preferably an elastomer. The thickness of the backing layer typically varies from about 0.1 to 2.5 mm. Non-limiting examples of materials whereof the backing layer can be made of are polyethylene, cork, polyurethane and ethylene-vinyl acetate. The thickness of a polyethylene backing layer 105 is for example typically 2 mm or smaller. The backing layer 105 commonly provides additional robustness, dimensional stability, and/or impact resistances to the panel as such, which increases the durability of the panel. Moreover, the (flexible) backing layer 105 may increase the acoustic (sound-dampening) properties of the panel 1.

In the following figures, the backing layer 105 and the top structure 12 have not been shown separately for clarity reasons, but may be incorporated in each of the figures shown.

Figure 3:
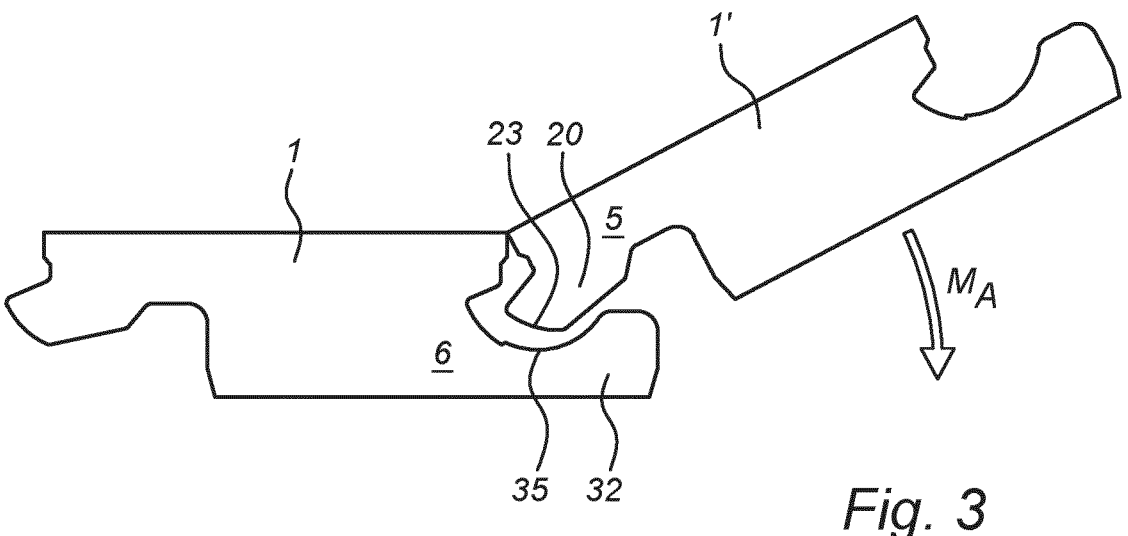
FIG. 3 shows a method of coupling of the side edges shown in FIG. 2.

FIG. 3 shows a method of coupling of two panels 1 and 1', each being provided with first and second coupling parts 5 and 6 as shown in FIG. 2. The two panels are coupled to each other by an angling movement over arrow MA. As evident from FIG. 3, the curvature of top surface of the lower lip 32 functions as sliding surface for the at least partially rounded bottom surface 23 and/or side surface 23 of the tongue 20.

Figure 4:
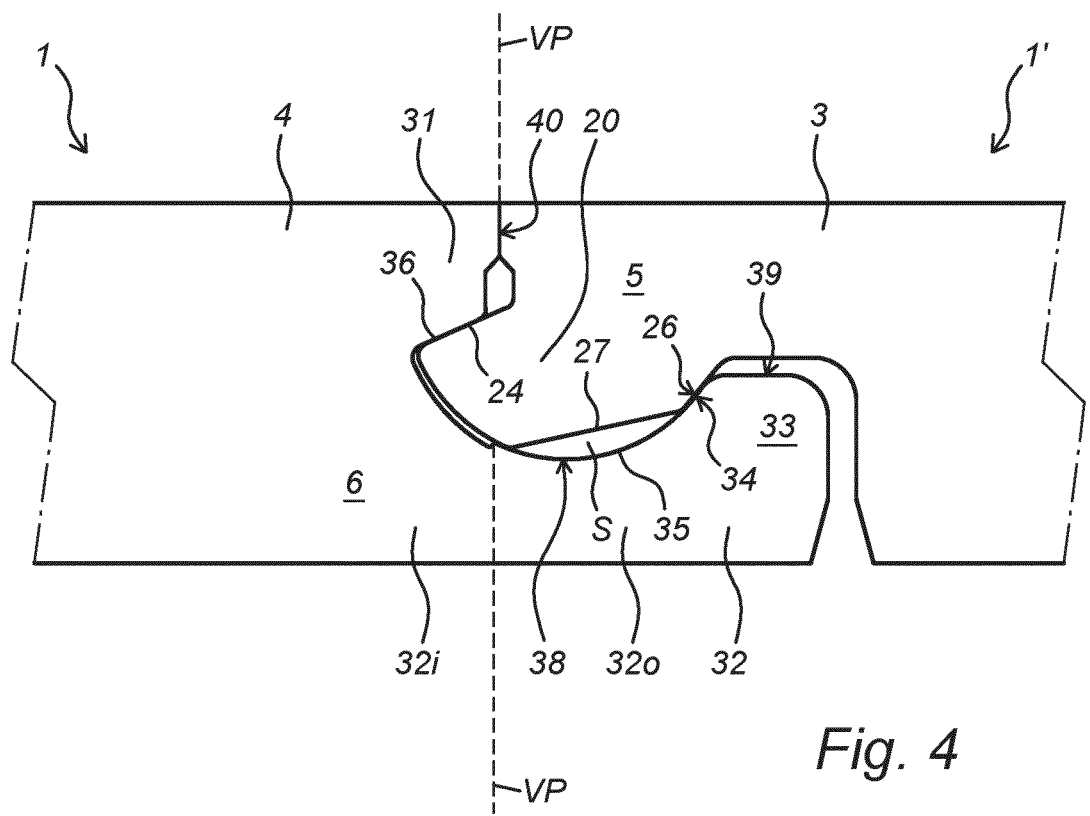
FIG. 4 shows in a transversal cross-section, the side edges of FIG. 2 in coupled condition.

FIG. 4 shows the coupling parts 5 and 6 of the two panels 1 and 1' once the coupling shown in FIG. 3 has been completed by the angling movement. The respective contact portions 26 and 34 in the shown coupled status, together create a tension force (T1) which forces the side edges 3 and 4 towards each other.

Further in the shown coupled status, the at least partially curved top surface 35 of the lower lip 32 and the passive bottom surface 27 of the sideward tongue 20 are mutually situated such that an intermediate space S is present adjacent to actively co-acting first and second contact portions 26 and 34. The passive bottom surface 27 is depicted as a substantially flat surface, but may alternatively have a concave or convex surface, as long as an amount of intermediate space S is maintained between tongue and recess in coupled status. A lower surface 36 of the upper lip 31 is at least partially inclined and configured to abut at least a part of the top surface 24 of the front region of the sideward tongue 20. The top surface 35 of the lower lip defines a deepest point 38 of the recess, wherein the shoulder 33 of the lower lip defines a highest point 39 of the lower lip, wherein said deepest point and highest point define a lower lip depth (LLD). On the upper side of the panels 1 and 1' which are forced together by the tension force from contact portions 26 and 34, a seam 40 is present which defines a vertical plane VP which subdivides the lower lip 32 into an inner lower lip part 32i and an outer lower lip part 320. The top surface of the shoulder part 33 is herein located at a distance from first coupling part 5, so that an intermediate space is present at this part as well.

Figures 5, 6:
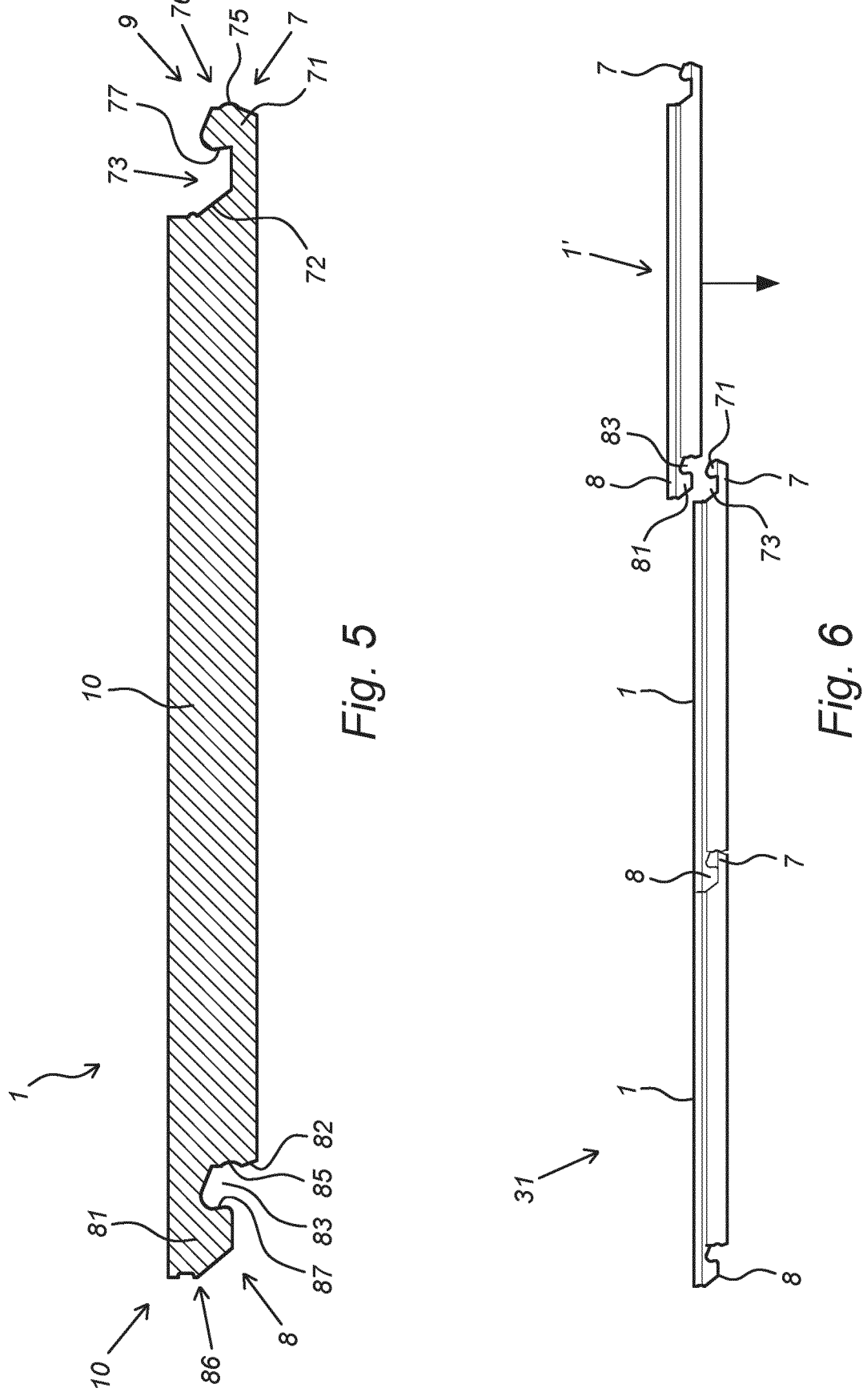
FIG. 5 shows a longitudinal cross-section along line B-B in FIG. 1 of respective side edges.
FIG. 6 shows a method of coupling of the side edges shown in FIG. 5.

FIG. 5 shows a longitudinal cross-section of a panel 1 shown in FIG. 1, along line B-B. At side edges 9 resp. 10, a third coupling part in the form of profile 7 resp. a fourth coupling profile in the form of profile 8 is provided. The third coupling part 7 comprises an upward tongue 71, an upward flank 72 situated at a distance from the upward tongue and an upward groove 73 formed in between the upward tongue 71 and the upward flank 72, wherein the upward groove is adapted to receive at least a part of a downward tongue 81 of the fourth coupling part 8 of another panel. The side of the upward tongue 71 facing the upward flank 72 is the inside 77 of the upward tongue, and the side of the upward tongue 71 facing away from the upward flank 72 is the outside 76 of the upward tongue. A first locking element 75 is provided at an outside of the upward tongue 71 facing away from the upward flank 72. The fourth coupling part 8 comprises a downward tongue 81, a downward flank 82 situated at a distance from the downward tongue, and a downward groove 83 formed in between downward tongue 81 and the downward flank 82, wherein the downward groove 83 is adapted to receive at least a part of the upward tongue 71 of the third coupling part 7 of another panel. The side of the downward tongue 81 facing the downward flank 82 is the inside 87 of the downward tongue and the side of the downward tongue 81 facing away from the downward flank 82 is the outside 86 of the downward tongue 81. A second locking element 85 adapted for co-action with a first locking element 75 of another panel, is provided at the downward flank 82.

FIG. 6 shows how the third and fourth coupling profiles 7 and 8 of FIG. 5 can be coupled to each other when connecting a panel 1 and a panel 1' to each other. The panel 1' is hereby moved vertically downwards along the arrow, wherein the profiles 7 and 8 engage with each other by receiving upward tongue 71 in downward groove 83 and receiving downward tongue 81 in upward groove 73.

Figure 7:
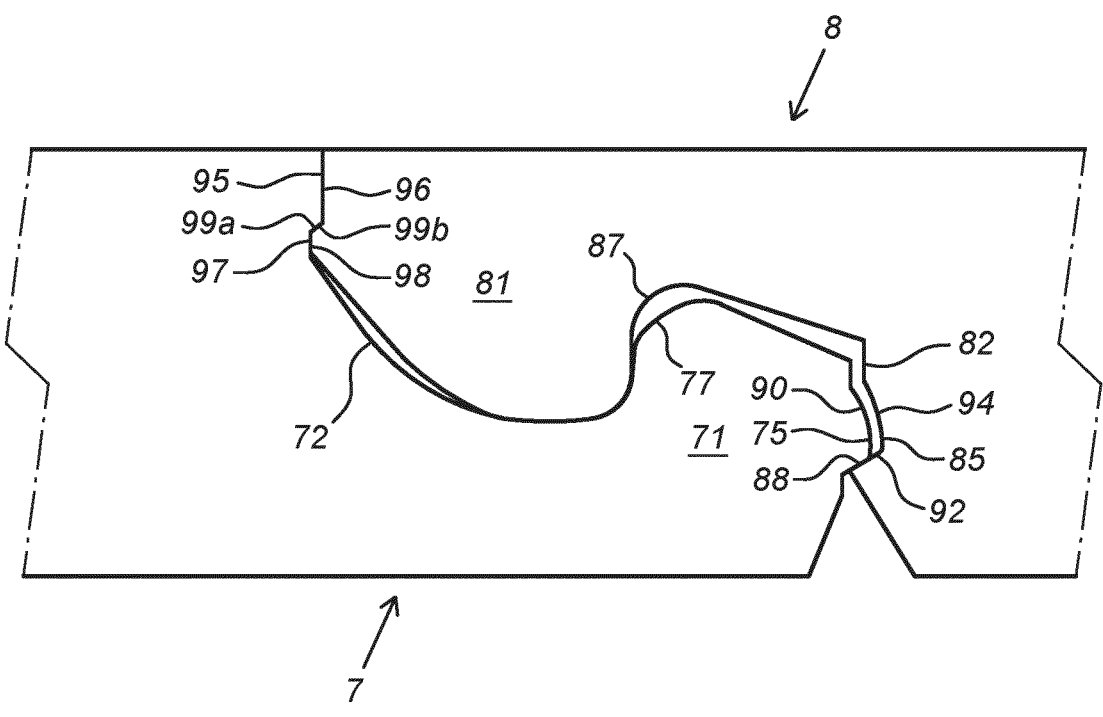
FIG. 7 shows in a longitudinal cross-section, further details of respective side edges when in coupled condition.

FIG. 7 shows in more detail the side edges 7 and 8 in coupled condition, after the coupling by vertical movement as shown in FIG. 6 has been completed. It is noted that the side edges 7 and 8 of the embodiment of FIG. 7 contain some slight adaptations over the embodiment shown in FIGS. 5 and 6, which are directly visible from the figures, and further explained below. As far as FIGS. 5-7 have the same features in common, these are indicated by the same reference numerals. The inside 77 of the upward tongue 71 is in contact with the inside 87 of the downward tongue 81 of another panel, such that the panels create a tension force (T2) which forces the side edges 7 and 8 towards each other. Part of the inside 77 of the upward tongue is inclined towards the upward flank 72, and part of the inside 87 of the downward tongue 81 is inclined towards the downward flank 82, such that the two coupled panels are interlocked in a direction perpendicular to the plane of the panels (i.e. in a vertical direction). Additionally, the first and second locking elements 75 and 85 interlock with each other, further contributing to the vertical interlocking of the coupled panels. The first locking element is a bulge 75, the second locking element is a recess 85. The bulge 75 has an upper portion 90 and an adjoining lower portion 88, wherein the lower portion 88 comprises an inclined locking surface and the upper portion 90 comprises a, preferably curved, guiding surface. The recess 85 comprises an upper portion 94 and an adjoining lower portion 92, wherein the lower portion 92 comprises an inclined locking surface.

The respective upper portions 90 and 94 are at a distance from each other, thus allowing for an intermediate space. At the upper side of the coupled side edges 7 and 8, the upper contact surfaces 95 and 96 are forced together due to the interaction of the insides 77 and 87. In addition, the respective upper contact surfaces 95 and 96 are provided with a bulge 98 and a recess 97, which interlock with each other in the coupled state. Above the bulge 98 and recess 97 respective inclined contact surfaces 99a and 99b are provided which engage with each other.

Figures 8, 9:
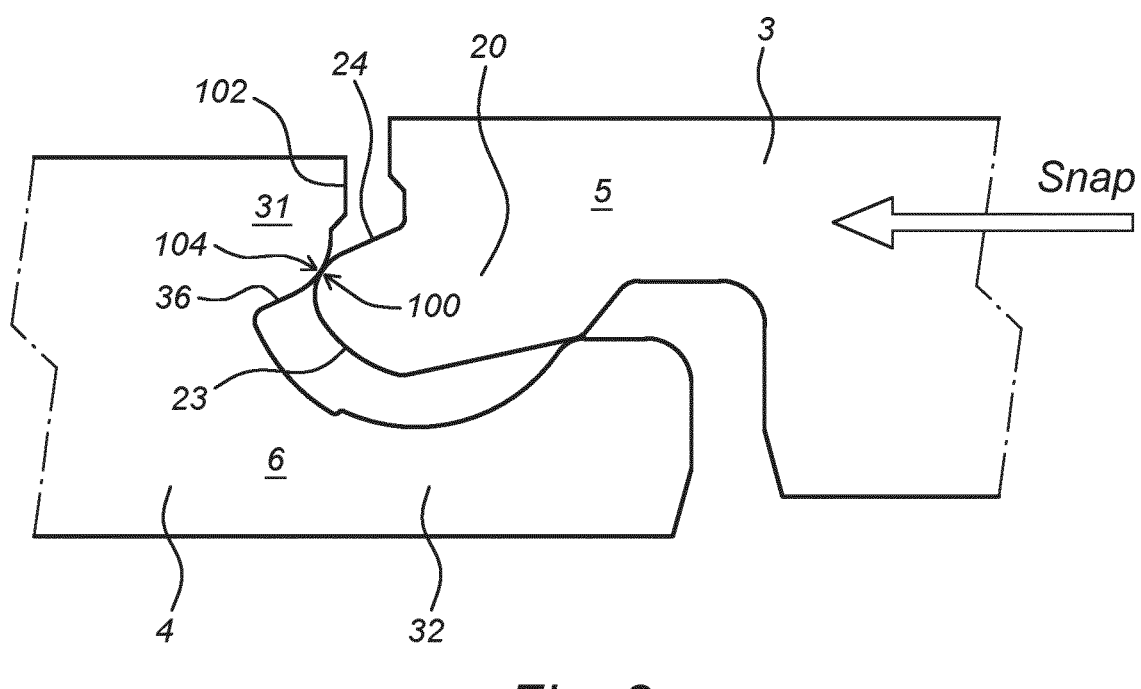
FIG. 8 shows an alternative embodiment of the side edges of FIG. 2 which allow for another method of coupling.
FIG. 9 shows another alternative embodiment of the side edges of FIG. 2.

FIG. 8 shows an alternative embodiment of the side edges 3 and 4 according to FIG. 2, wherein the upper surface 24 of the front region 21 of the sideward tongue and a side surface 23 of the front region 21 of the sideward tongue are connected by means of a transitional convex surface 100, and the lower surface 36 of the upper lip 31 and a side surface 102 of the upper lip 31 are connected by means of a transitional convex surface 104. All other features of the side edges 3 and 4 are similar to FIG. 2. The shown embodiment allows for a coupling movement by shifting the panels towards each other in a planar direction as indicated by the arrow 'Snap'.

FIG. 9 shows an alternative embodiment of the side edges 3 and 4 according to FIG. 2, wherein the upper surface 35 of the lower lip 32 has a staggered cut-out portion 35s which is complementary in size to the terminal portion 23 of the tongue 20, so that it encloses the portion 23 in a clamping way. All other features of the side edges 3 and 4 are similar to FIG. 2.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel comprising:
a core provided with an upper side and a lower side,
a decorative top structure affixed, either directly or indirectly, on said upper side of the core,
a first panel edge comprising a first coupling profile, and a second panel edge comprising a second coupling profile being designed to engage interlockingly with said first coupling profile of an adjacent panel, both in a horizontal direction and in a vertical direction,
wherein said core comprises at least one wool layer at least partially formed by man-made vitreous fibres bonded together by at least one cured thermoset polymeric binder material, and wherein the decorative top structure comprises at least one ceramic layer and/or glaze layer, wherein the decorative top structure is adhered onto the core by means of a waterproof adhesive.

2. The decorative panel according to claim 1, wherein at least a fraction of the man-made vitreous fibres are made of at least one material selected from the group consisting of: stone wool, mineral wool, slag wool, basalt wool, and glass fibres.

3. The decorative panel according to claim 1, wherein the at least one binder material comprises at least one of a urea-modified phenol formaldehyde resin and an alkanolamine/carboxylic acid anhydride reaction product.

4. The decorative panel according to claim 1, wherein the at least one binder material comprises at least one of an acrylic resin and an epoxy resin.

5. The decorative panel according to claim 1, wherein the at least one binder material is formed by a sugar component comprising at least one of sucrose, reducing sugars, and mixtures thereof.

6. The decorative panel according to claim 1, wherein the core comprises at least one main binder material comprising at least one of a urea-modified phenol formaldehyde resin and an alkanolamine/carboxylic acid anhydride, and wherein the core comprises at least one co-binder material comprising at least one of an acrylic resin and an epoxy resin.

7. The decorative panel according to claim 1, wherein the core comprises a mixture of binder materials, wherein a first binder material has a higher curing temperature and/or curing rate than at least one second binder material.

8. The decorative panel according to claim 1, wherein the core comprises at least one fluorescent compound selected from the group consisting of: xanthenes, acridines, quinine, quinine derivatives, coumarins, and aryl sulfonates.

9. The decorative panel according to claim 1, wherein the fibres in the at least one wool layer of the core are oriented substantially vertical.

10. The decorative panel according to claim 1, wherein the core comprises at least one base wool layer comprising a first mineral wool, and at least one top wool layer, positioned on top of said base wool layer, comprising a second mineral wool, wherein the first wool and the second wool have different material compositions and/or different structural properties.

11. The decorative panel according to claim 1, wherein at least one core has a density lower than 1,200 kg/m3.

12. The decorative panel according to claim 1, wherein the decorative top structure is fused onto the core without using a separate adhesive.

13. The decorative panel according to claim 1, wherein a lower side of the decorative top structure penetrates into an upper side of the core.

14. The decorative panel according to claim 1, wherein the decorative top structure comprises at least one digitally printed decorative layer and at least one transparent wear layer covering said digitally printed decorative layer, wherein the top structure comprises at least one translucent glaze layer, wherein said wear layer is formed by said glaze layer.

15. The decorative panel according to claim 1, wherein the top structure comprises at least one layer at least partially composed of a material selected from the group consisting of: glaze, ceramic, stone, linoleum, ceramic, stone, concrete, mineral porcelain, glass, quartz, soapstone, mosaic, granite, limestone and marble.

16. The decorative panel according to claim 1, wherein the top structure comprises a textured upper surface.

17. The decorative panel according to claim 1, wherein the first coupling profile comprises:
an upward tongue,
at least one upward flank lying at a distance from the upward tongue,
an upward groove formed in between the upward tongue and the upward flank wherein the upward groove is adapted to receive at least a part of a downward tongue of a second coupling profile of an adjacent panel, and
at least one first locking element, preferably provided at a distant side of the upward tongue facing away from the upward flank,
and wherein the second coupling profile comprises:
a first downward tongue,
at least one first downward flank lying at a distance from the downward tongue,
a first downward groove formed in between the downward tongue and the downward flank, wherein the downward groove is adapted to receive at least a part of an upward tongue of a first coupling profile of an adjacent panel, and
at least one second locking element adapted for co-action with a first locking element of an adjacent panel, said second locking element preferably being provided at the downward flank; and/or
wherein the panel comprises at least one third coupling profile and at least one fourth coupling profile located respectively at a third panel edge and a fourth panel edge, wherein the third coupling profile comprises:
a sideward tongue extending in a direction substantially parallel to the upper side of the core,
at least one second downward flank lying at a distance from the sideward tongue, and
a second downward groove formed between the sideward tongue and the second downward flank,
wherein the fourth coupling profile comprises:
a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

18. The decorative panel according to claim 1, wherein at least a part of each coupling profile is integrally made from material of the core.

19. The decorative panel according to claim 1, wherein the at least one wool layer has a varying density in the thickness direction of said wool layer.

20. A decorative covering, comprising a plurality of mutually coupled decorative panels according to claim 1.

* * * * *